United States Patent
Kawai et al.

(10) Patent No.: US 9,436,064 B2
(45) Date of Patent: Sep. 6, 2016

(54) IMAGING DEVICE, AND FOCUS-CONFIRMATION DISPLAY METHOD

(71) Applicant: FUJIFILM Corporation, Tokyo (JP)

(72) Inventors: Tomoyuki Kawai, Saitama (JP); Yoichi Iwasaki, Saitama (JP); Kazuki Inoue, Saitama (JP); Takehiro Koguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 13 days.

(21) Appl. No.: 14/643,319

(22) Filed: Mar. 10, 2015

(65) Prior Publication Data
US 2015/0185585 A1 Jul. 2, 2015

Related U.S. Application Data

(63) Continuation of application No. PCT/JP2013/074832, filed on Sep. 13, 2013.

(30) Foreign Application Priority Data

Sep. 19, 2012 (JP) ................. 2012-206214

(51) Int. Cl.
*G03B 13/28* (2006.01)
*G02B 7/34* (2006.01)
(Continued)

(52) U.S. Cl.
CPC ............. *G03B 13/28* (2013.01); *G02B 7/34* (2013.01); *H04N 5/23212* (2013.01); *H04N 5/23293* (2013.01); *H04N 5/3696* (2013.01); *G03B 13/36* (2013.01); *G03B 17/18* (2013.01);
(Continued)

(58) Field of Classification Search
None
See application file for complete search history.

(56) References Cited

U.S. PATENT DOCUMENTS

| 7,099,575 B2 * | 8/2006 | Toji ................. H04N 5/23212 348/E5.045 |
| 7,649,537 B2 * | 1/2010 | Campbell ................. G06T 1/20 345/502 |

(Continued)

FOREIGN PATENT DOCUMENTS

| JP | 2001-309210 A | 11/2001 |
| JP | 2004-40740 A | 2/2004 |

(Continued)

OTHER PUBLICATIONS

International Search Report, issued in PCT/JP2013/074832, dated Oct. 22, 2013.

(Continued)

*Primary Examiner* — Michael Osinski
(74) *Attorney, Agent, or Firm* — Birch, Stewart, Kolasch & Birch, LLP

(57) ABSTRACT

The present invention provide an imaging device that includes an image generation device, a boundary change device configured to change a position of a boundary between the first image and the second image in the second image for display, in a direction orthogonal to the boundary, a selection device configured to select any one of the first image and the second image for each of a plurality of divisions in the second image for display, divided by the boundary changed by the boundary change device, a display device, and a display control device configured to allow the display device to display the first image for display, and allows the second image for display in which a position of the boundary is changed by the boundary change device to be displayed in a display area in the first image for display.

18 Claims, 29 Drawing Sheets

(51) Int. Cl.
*H04N 5/232* (2006.01)
*H04N 5/369* (2011.01)
*G03B 13/36* (2006.01)
*G03B 17/18* (2006.01)

(52) U.S. Cl.
CPC ....... *H04N5/23216* (2013.01); *H04N 5/23219* (2013.01); *H04N 5/23245* (2013.01)

(56) References Cited

U.S. PATENT DOCUMENTS

| | | | | |
|---|---|---|---|---|
| 8,085,337 | B2* | 12/2011 | Onuki | H04N 5/23212 348/222.1 |
| 8,885,089 | B2* | 11/2014 | Aoki | G02B 7/34 348/208.12 |
| 9,025,011 | B2* | 5/2015 | Horikawa | H04N 13/0203 348/49 |
| 9,113,071 | B2* | 8/2015 | Shiohara | H04N 5/23212 |
| 9,167,153 | B2* | 10/2015 | Kawai | G02B 7/34 |
| 9,179,059 | B2* | 11/2015 | Kawai | G02B 7/34 |
| 2005/0191047 | A1 | 9/2005 | Toji | |
| 2008/0112648 | A1* | 5/2008 | Hatano | G06K 9/00228 382/298 |
| 2009/0153693 | A1 | 6/2009 | Onuki et al. | |
| 2009/0153720 | A1 | 6/2009 | Suzuki et al. | |
| 2010/0271549 | A1* | 10/2010 | Kuwabara | G06T 11/60 348/564 |
| 2013/0129226 | A1* | 5/2013 | Abe | G06T 7/0044 382/199 |
| 2015/0103210 | A1* | 4/2015 | Inoue | G02B 7/346 348/239 |
| 2015/0156405 | A1* | 6/2015 | Izawa | G02B 7/34 348/246 |
| 2015/0172532 | A1* | 6/2015 | Izawa | H04N 5/23212 348/333.11 |
| 2015/0181194 | A1* | 6/2015 | Izawa | G02B 7/34 348/49 |
| 2015/0181196 | A1* | 6/2015 | Izawa | G03B 13/18 348/46 |
| 2015/0201123 | A1* | 7/2015 | Koguchi | H04N 5/23212 348/239 |
| 2015/0281560 | A1* | 10/2015 | Inoue | H04N 5/23293 348/222.1 |
| 2015/0304529 | A1* | 10/2015 | Kawai | G02B 7/34 348/240.3 |
| 2015/0304546 | A1* | 10/2015 | Izawa | G02B 7/34 348/229.1 |
| 2016/0014329 | A1* | 1/2016 | Okigawa | H04N 5/23212 348/346 |
| 2016/0028940 | A1* | 1/2016 | Izawa | G03B 17/20 348/349 |

FOREIGN PATENT DOCUMENTS

| | | |
|---|---|---|
| JP | 2009-147665 A | 7/2009 |
| JP | 2009-163220 A | 7/2009 |
| JP | 2009-276426 A | 11/2009 |
| JP | 2012-113064 A | 6/2012 |

OTHER PUBLICATIONS

Written Opinion of the International Searching Authority, issued in PCT/JP2013/074832, dated Oct. 22, 2013.

* cited by examiner

IMAGING DEVICE, AND FOCUS-CONFIRMATION DISPLAY METHOD

CROSS-REFERENCE TO RELATED APPLICATIONS

This application is a Continuation of PCT International Application No. PCT/JP2013/074832 filed on Sep. 13, 2013, which claims priority under 35 U.S.C §119(a) to Japanese Patent Application No. 2012-206214 filed on Sep. 19, 2012. Each of the above application(s) is hereby expressly incorporated by reference, in its entirety, into the present application.

BACKGROUND OF THE INVENTION

1. Field of the Invention

The present invention relates to an imaging device and a focus-confirmation display method that display an image (hereinafter also referred to as a "split image") to be used for focus-confirmation during manual focusing.

2. Description of the Related Art

There is a well-known digital camera provided with an autofocus function using a phase difference detection method or a contrast detection method along with a so-called manual focus mode in which a user can manually adjust focus. There is a well-known digital camera with a manual focus mode using a method as follows: a method in which a reflex mirror is provided so that focus can be adjusted while a photographed subject is checked, and a split microprism screen is used to display visual phase difference; and a method in which contrast is visually checked.

In a digital camera without a reflex mirror that has become wide spread in recent years, there is no method of checking a subject image while displaying phase difference because no reflex mirror is provided. As a result, focusing has to rely on a contrast detection method. In this case, however, it is impossible to display an image with contrast higher than that in resolution of a display device such as an LCD, so that a method of partially enlarging the image has to be used to display the image.

Thus, in recent years, a split image (focus-confirmation image) is displayed in a live view image so that an operator can easily focus on a subject at the time of a manual focus mode. The split image is formed by combining two subject images (two phase difference images) acquired by a pupil-split method to show phase difference between the subject images. That is, there is displayed a split image in which an upper half of one of the subject images is vertically adjacent to a lower half of the other of the subject images. In a state where the images are out of focus, the two subject images vertically adjacent to each other are deviated right and left, and in a state where the images come into focus, there is no deviation in the right and left of the two subject images vertically adjacent to each other. The operator operates a focus ring so that there is no deviation in the right and left of the two subject images in the split image, thereby focusing on the subject.

Japanese Patent Application Laid-Open No. 2004-40740 (hereinafter referred to as PTL 1) describes a digital camera in which an aperture is moved in an optical axis and a vertical direction so that a subject image is photographed at each of two ranging positions to display a split image in a live view image by using two images of the subject at the two ranging positions.

Japanese Patent Application Laid-Open No. 2001-309210 (hereinafter referred to as PTL 2) describes a digital camera in which a value corresponding to a distance between an image surface of a subject image and a receiving surface of an imaging element is acquired as the amount of deviation so that, in a live view image, there is displayed a split image in which images are displaced in respective right and left directions opposite to each other in accordance with the amount of the deviation.

Japanese Patent Application Laid-Open No. 2009-147665, Japanese Patent Application Laid-Open No. 2009-163220, and Japanese Patent Application Laid-Open No. 2009-276426 (hereinafter respectively referred to as PTL 3, PTL 4, and PTL 5) describe digital cameras each of which includes an imaging element in which a plurality of normal pixels for photographing, and a plurality of two types of phase difference pixel for detecting a focus that receive subject light beams to which pupil-split is applied, are arranged on an imaging surface. The digital camera creates a photographed image on the basis of an output signal from each of the normal pixels to display a live view image, as well as creates a split image on the basis of output from each of the two types of phase difference pixel to display the split image in the live view image.

In addition, PTL 5 discloses a split image in which a position of each of images is changed, a split line whose directions are changed, and a split image that is enlarged.

SUMMARY OF THE INVENTION

However, since the digital camera described in PTL 1 requires a mechanical configuration for moving an aperture, there is a problem of securing a space for storing the configuration and a problem of increase in the number of components. In addition, since the digital camera described in PTL 2 includes no configuration in which pupil-split is applied to subject light beams to take an image, it is difficult to achieve a focus-confirmation image (split image) that is accurate and has no failure.

Each of the digital cameras described in PTLs 3 and 4 creates a split image by using two types of phase difference pixel, however, each of the digital cameras only displays an upper half and a lower half of each of two images of a subject (phase difference images) photographed by a pupil-split method. Thus, a position of a split line serving as a boundary line between the two images of the subject is fixed. In addition, it is recognized whether the image of the subject is focused by gazing around a boundary line (split line) between two subject images that are deviated from each other in a non-focusing state. Thus, if a split line exists in a position different from a position to be in focus, a user cannot accurately adjust focus by manual focusing.

Although the digital camera described in PTL 5 changes a position of each of images in a split image, there is a problem in which if a position of each of the images in the split image is changed after a photographer sets a field angle so that an image of a subject to be in focus by manual focusing fits within a display area of the split image, the photographer is embarrassed. In addition, according to the digital camera described in PTL 5, directions (horizontal and vertical split directions) of a split line are changed, however, there is a problem in which if a direction of the split line is suddenly changed in the vertical direction when a photographer manually operates the digital camera so as to eliminate deviation in the horizontal direction during focusing by manual focusing, for example, the photographer is embarrassed. Further, according to the digital camera described in PTL 5, a split image is enlarged, however, there is a case where it is not intended to enlarge the split image, but to change a position of a split line.

For example, when a face of a person is a main subject and it is intended to focus on a face image in a split image displayed at a predetermined position and a predetermined size in a display screen on the basis of a split line displayed in a predetermined direction, there is a case where the split line may not exist at a position of the face image depending on a photographing scene. If it is intended to focus on a specific position in the face image (such as a position of eyes), it is possible to adjust focus at only the center in the split image. In addition, if it is intended to focus on a plurality of places in the split image, it is possible to adjust focus at only one place of the center in the split image.

It is an object of the present invention to provide an imaging device and a focus-confirmation display method, capable of facilitating a manual focus operation by a user without changing a position or a size of an image for focus-confirmation, or directions of a boundary line between divisions of the image for focus-confirmation.

In order to achieve the object above, the present invention provide an imaging device that includes: an image generation device configured to generate a first image for display on the basis of an image outputted from an imaging element provided with first and second pixel groups on which subject light beams passing through first and second regions in a photographic lens are incident, respectively, after pupil-split is applied to the subject light beams, and configured to generate a second image for display to be used for focus-confirmation on the basis of a first image and a second image outputted from the first and second pixel groups, respectively; a boundary change device configured to change a position of a boundary between the first image and the second image in the second image for display, in a direction orthogonal to the boundary; a selection device configured to select any one of the first image and the second image for each of a plurality of divisions in the second image for display, divided by the boundary changed by the boundary change device; a display device; and a display control device configured to allow the display device to display the first image for display, and allows the second image for display in which a position of the boundary is changed by the boundary change device to be displayed in a display area in the first image for display.

Accordingly, since a position of the boundary (split line) in the second image for display (split image) to be used for focus-confirmation is changed in a direction orthogonal to the boundary, it is possible that a user can easily perform a manual focus operation without changing a position or a size of the second image for display (split image), or without changing directions of the boundary.

In one embodiment, there is provided a position input device configured to input a command for changing a position of the boundary in the second image for display, and the boundary change device changes a position of the boundary in the second image for display in accordance with the command for changing a position received from the position input device so that the display device displays the position. Accordingly, it is possible to change a position at which focusing is performed by inputting a command for changing a position of the boundary (split line).

In one embodiment, the display device is a display device of a touch panel type, and the position input device is composed of the display device of a touch panel type, and when a drag operation of dragging the boundary in the second image for display is performed in the display device of a touch panel type while the second image for display is displayed in the display device, the boundary change device changes a position of the boundary in the second image for display in response to the drag operation.

In one embodiment, there is provided a number input device configured to input the number of boundaries in the second image for display, and the boundary change device changes the number of the boundaries in the second image for display in accordance with the command for changing the number received from the number input device so that the display device displays the number of the boundaries. Accordingly, it is possible to easily find where is focused on the second image for display (split image) by inputting the number of boundaries (split lines).

In one embodiment, if the number L of the boundaries received is an odd number, the boundary change device positions a boundary at a place of (L+1)/2 of the number L of the boundaries at the center of the second image for display, or at a position near the center of the second image for display. Accordingly, once the number of the boundaries is changed according to the number designated by a user, in a case where the number of the boundaries is an odd number, the center boundary is set so as to be positioned at the center or near the center of the second image for display (split image), thereby facilitating a focusing operation.

In one embodiment, the boundary change device changes a position of the boundary in the second image for display as time elapses. Accordingly, since the boundary (split line) moves so as to scan the second image for display (split image) used for focus-confirmation as time elapses, it is easy to find where is focused on the second image for display (split image).

In one embodiment, there is provided a focusing operation device configured to change a focus position of a photographic lens, and when the focusing operation device starts changing a focus position, the boundary change device stops movement of a boundary in the second image for display. Accordingly, it is possible to fix a position to be focused during a focusing operation, so that a user can easily perform the focusing operation.

In one embodiment, the imaging element further includes a third pixel group to which subject light beams are incident in a state where pupil-split is not applied to the light beams, and the first image for display is generated on the basis of a third image outputted from the third pixel group.

In one embodiment, the image generation device arranges the first image and the second image in the second image for display so that the first image and the second image are adjacent to each other.

In addition, in one embodiment, the image generation device arranges the third image in the second image for display so that the third image is adjacent to the first image and the second image. Accordingly, since phase difference occurs even in a boundary between phase difference images (the first image and the second image) and a normal image (the third image), focusing may be facilitated.

Further, in one embodiment, the image generation device alternately arranges the first image and the second image in a first direction in the second image for display, as well as alternately arranges the first image and the second image in a second direction orthogonal to the first direction in the second image for display, to generate the second image for display in which the first image and the second image are arranged in a lattice pattern. Accordingly, the phase difference images (the first image and the second image) are arranged in the lattice pattern to clarify a difference in images in focus and out of focus, thereby facilitating focusing.

In one embodiment, there is provided an image analysis device configured to analyze an image outputted from the imaging element, and the boundary change device changes a position of the boundary in the second image for display on the basis of an analysis result obtained by the image analysis device. Accordingly, since a position of the boundary is changed on the basis of the analysis result of the image obtained from the imaging element, a user can perform focusing by viewing the second image for display (split image) in which a position of the boundary is changed to a preferable position without designating a position of the boundary.

In one embodiment, the image analysis device detects phase difference between pixels of the first images and pixels of the second image corresponding to the pixels of the first image, and the boundary change device changes a position of the boundary in the second image for display on the basis of the detected phase difference. Accordingly, a position of the boundary is changed to a positon out of focus on the basis of phase difference between a pair of pixels, so that a user can easily perform a focusing operation.

In one embodiment, the image analysis device detects contrast in the image, and the boundary change device changes a position of the boundary in the second image for display on the basis of the amount of detected contrast. Accordingly, a position of the boundary is changed to a high contrast position to be easily focused on the basis of the contrast, so that a user can easily perform a focusing operation.

In one embodiment, the image analysis device detect an edge in a direction of the boundary of the image, and the boundary change device changes a position of the boundary in the second image for display on the basis of the amount of the detected edge. Accordingly, a position of the boundary is changed to a position to be easily focused on the basis of the amount of the detected edge in the direction of the boundary, so that a user can easily perform a focusing operation.

In one embodiment, the image analysis device detects a specific object in the image, and the boundary change device set the boundary in the second image for display at a position of the detected specific object. Accordingly, since a position of the boundary is set at a portion of the specific object that seems a main subject, it is possible to easily perform a focusing operation.

In one embodiment, the display control device allows an index showing a position of the boundary to be indicated near the boundary. Accordingly, even if there is change in positon or number of the boundary, it is possible to easily perform focusing while viewing the index showing a position of the boundary.

A filter array of pixels of the imaging element is not particularly limited. For example, there is an imaging element as follows: an imaging element in which a plurality of first pixels and a plurality of second pixels are arranged in a part of a pixel array composed of the Bayer array; an imaging element in which a plurality of first pixels and a plurality of second pixels are arranged in a part of a pixel array in which a basic array pattern of a non-Bayer array is repeatedly arranged in a first direction and a second direction; and an imaging element in which a plurality of first pixels and a plurality of second pixels are arranged in a part of a pixel array composed of a two-face array including pixels of the same color that are displaced to be arranged, as well as in which a pair of pixels of the first pixels and the second pixels are arranged so as to be adjacent to each other.

In addition, the present invention provides a focus-confirmation display method that uses an imaging element provided with first and second pixel groups on which subject light beams passing through first and second regions in a photographic lens are incident, respectively, after pupil-split is applied to the subject light beams, and that uses a display device, and the focus-confirmation display method includes the steps of: allowing the display device to display a first image for display generated on the basis of an image outputted from the imaging element; displaying a second image for display generated on the basis of a first image and a second image that are outputted from the first and second pixel groups, respectively, to be used for focus-confirmation in a display area in the first image for display; changing a position of a boundary between the first image and the second image in the second image for display in a direction orthogonal to the boundary; selecting any one of the first image and the second image for each of a plurality of divisions divided by the changed boundary in the second image for display; and displaying the second image for display in which a position of the boundary is changed in the display area in the first image for display.

According to the present invention, a user can easily preform a manual focus operation without changing a position or a size of an image for focus-confirmation, or without changing a direction of a boundary line between divisions in an image for focus-confirmation.

DETAILED DESCRIPTION OF THE PREFERRED EMBODIMENTS

Referring to accompanying drawings, embodiments of the present invention will be described in detail.

(Example of Configuration of Digital Camera)

Figure 1:
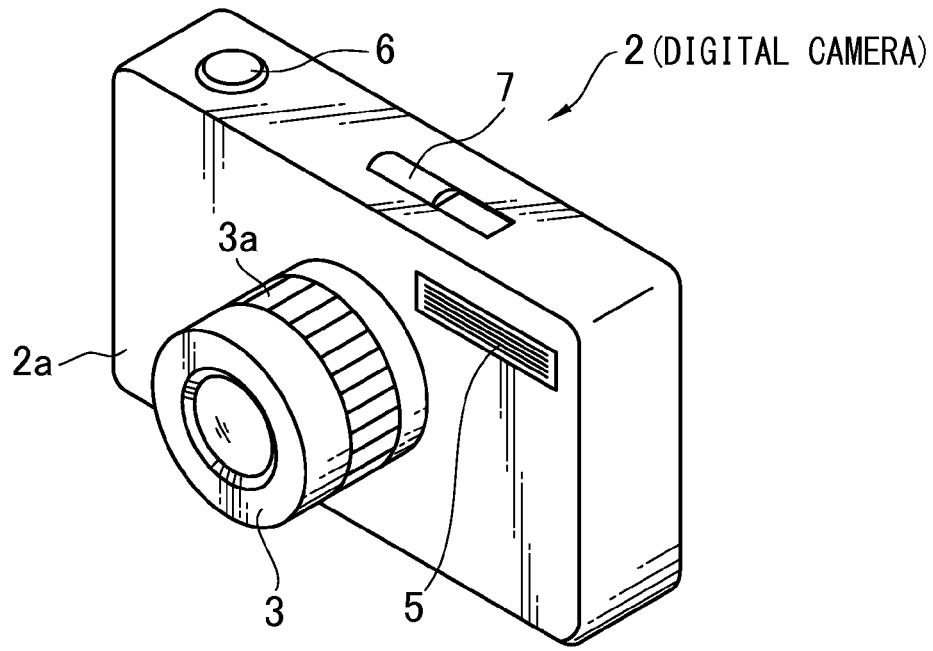
FIG. 1 is a perspective view of the front of a digital camera.

As shown in FIG. 1, a digital camera 2 that is an example of an imaging device of the present invention includes a camera body 2a provided in its front face with a lens barrel 3 composed of an imaging optical system and the like, a flash light emission section 5, and the like. The camera body 2a is provided in its top face with a shutter button 6, a power switch 7, and the like. The lens barrel 3 is provided in its outer peripheral surface with a focus ring (lens movement mechanism) 3a used for a manual focus (hereinafter referred to as simply "MF") operation in a rotatable manner.

Figure 2:
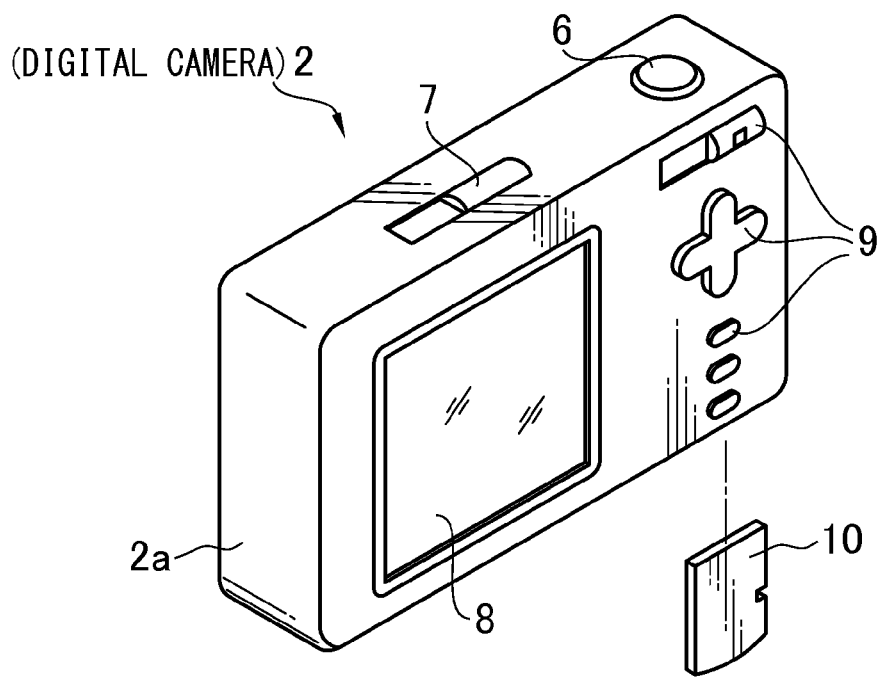
FIG. 2 is a perspective view of the back of the digital camera.

As shown in FIG. 2, the camera body 2a is provided in its back face with a display 8 and an operation section 9. The display 8 serves as an electronic view finder when photographing is on standby to display a live view image (or called a through image). In addition, when an image is reproduced, the image is reproduced and displayed on the display 8 on the basis of image data recorded in a memory card 10.

The operation section 9 is composed of various switches. The operation section 9 of the present example is composed of a mode shift switch, a cross key, an execute key, and the like. The mode shift switch is operated when an operation mode of the digital camera 2 is changed. The digital camera 2 has a photographing mode of photographing a subject to acquire photographed image, a reproducing mode of reproducing and displaying a photographed image, and the like. In addition, the photographing mode includes an AF mode of performing autofocus (hereinafter referred to as simply "AF"), and an MF mode of performing an MF operation.

The cross key and the execute key are used for various operations. In the MF mode, the cross key and the execute key of the present example are used as a device (position input device and number input device) that accepts input of instructions to change a position of a split line (hereinafter may be referred to as a "boundary line" or simply a "boundary"), the number thereof, a shape thereof, and the like, when a focus-confirmation image described later is displayed. In addition, the cross key and the execute key are operated at the time of: displaying a menu screen and a setting screen; moving a cursor displayed in the menu screen and the setting screen; determining various setting items of the digital camera 2; and the like.

The camera body 2a is provided in its bottom face with a card slot (not shown) into which the memory card 10 is to be inserted, and an insertion lid for opening and closing an opening of the card slot.

Figure 3:
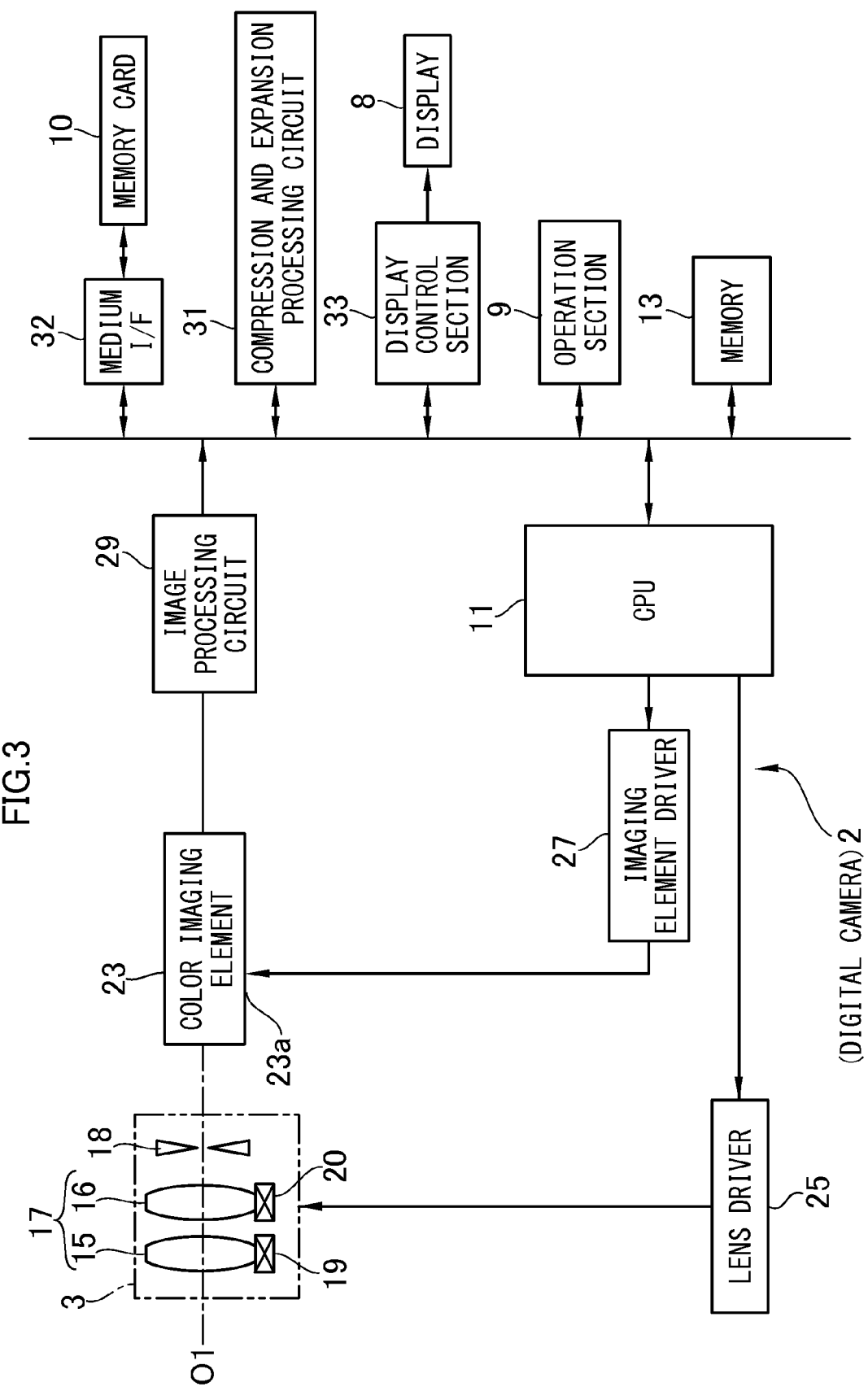
FIG. 3 is an electrical block diagram of the digital camera.

As shown in FIG. 3, a CPU 11 of the digital camera 2 sequentially executes various programs and data, read out from the memory 13 on the basis of a control signal from the operation section 9 to integrally control each of sections of the digital camera 2. The memory 13 includes a RAM area serving as a work memory for allowing the CPU 11 to perform processing, and as a storage for temporarily storing various data items. The lens barrel 3 is provided with a photographic lens 17 including a zoom lens 15 and a focus lens 16, a mechanical shutter 18, and the like. The zoom lens 15 and the focus lens 16 are driven by a zoom mechanism 19 and a focus mechanism 20, respectively, to be moved back and forth along an optical axis O1 of the photographic lens 17. The zoom mechanism 19 and the focus mechanism 20 are composed of a gear, a motor, and the like. In addition, the focus mechanism 20 is connected to a focus ring 3a (focusing operation section) through a gear (not shown). Accordingly, the focus mechanism 20 moves the focus lens 16 along a direction of the optical axis O1 (hereinafter referred to as an "optical axis direction") as the focus ring 3a is rotated during the MF mode. That is, a focusing operation of changing a position (focus position) of the focus lens of the photographic lens 17 is performed with the focus ring 3a.

The mechanical shutter 18 includes a movable part (not shown) that moves between a closed position for preventing subject light from being incident on the imaging element 23 and an opened position for allowing the subject light to be incident on the imaging element 23. Accordingly, the mechanical shutter 18 moves the movable part to each of the positions to open or close an optical path from the photographic lens 17 to the imaging element 23. In addition the mechanical shutter 18 includes a diaphragm for controlling the amount of the subject light incident on the imaging element 23. Operation of the mechanical shutter 18, the zoom mechanism 19, and the focus mechanism 20, is controlled by the CPU 11 through a lens driver 25.

The imaging element 23 (hereinafter referred to as simply an "imaging element") is arranged behind the mechanical shutter 18. The imaging element 23 converts subject light passing through the photographic lens 17 and the like into an electrical output signal and outputs the electrical output signal. Various imaging elements such as a CCD (Charge Coupled Device) type imaging element, and a CMOS (Complementary Metal Oxide Semiconductor) type imaging element, may be applicable to the imaging element 23. Under control of the CPU 11, an imaging element driver 27 controls drive of the imaging element 23.

An image processing circuit 29 applies various kinds of processing, such as gradation conversion, white balance correction, γ-correction processing, and the like, to an output signal (output) from the imaging element 23 to generate photographed image data. In addition, during the MF mode, the image processing circuit 29 generates not only the photographed image data but also split image data (hereinafter may be referred to as a "focus-confirmation image") for the MF operation. The photographed image data and the split image data are temporarily stored in a VRAM region (VRAM may be separately provided) in the memory 13. The VRAM region includes a memory area for a live view image in which images for continuous two fields are stored, and sequentially stores the photographed image data and the split image data by overwriting existing data.

A compression and expansion processing circuit 31 applies compression processing to photographed image data stored in the VRAM region when the shutter button 6 is pressed. In addition, the compression and expansion processing circuit 31 applies expansion processing to compression image data obtained from the memory card 10 through a medium I/F 32. The medium I/F 32 preforms recording, read-out, and the like, of photographed image data with respect to the memory card 10.

During the photographing mode, a display control section 33 reads out photographed image data stored in the VRAM region and split image data to sequentially output the data to the display 8. In addition, during a reproducing mode, the display control section 33 outputs photographed image data expanded by the compression and expansion processing circuit 31 to the display 8.

The display 8 constitutes the "display device" of the present invention. The operation section 9 constitutes the "position input device" and the "number input device" of the present invention. The image processing circuit 29 and the CPU 11 constitute the "image generation device", the "boundary change device", the "selection device", and the "image analysis device", of the present invention. In addition, the CPU 11 sometimes constitutes the "position input device" and the "number input device". The display control section 33 constitutes the "display control device" of the present invention.

(Configuration of Color Imaging Element)

Figure 4:
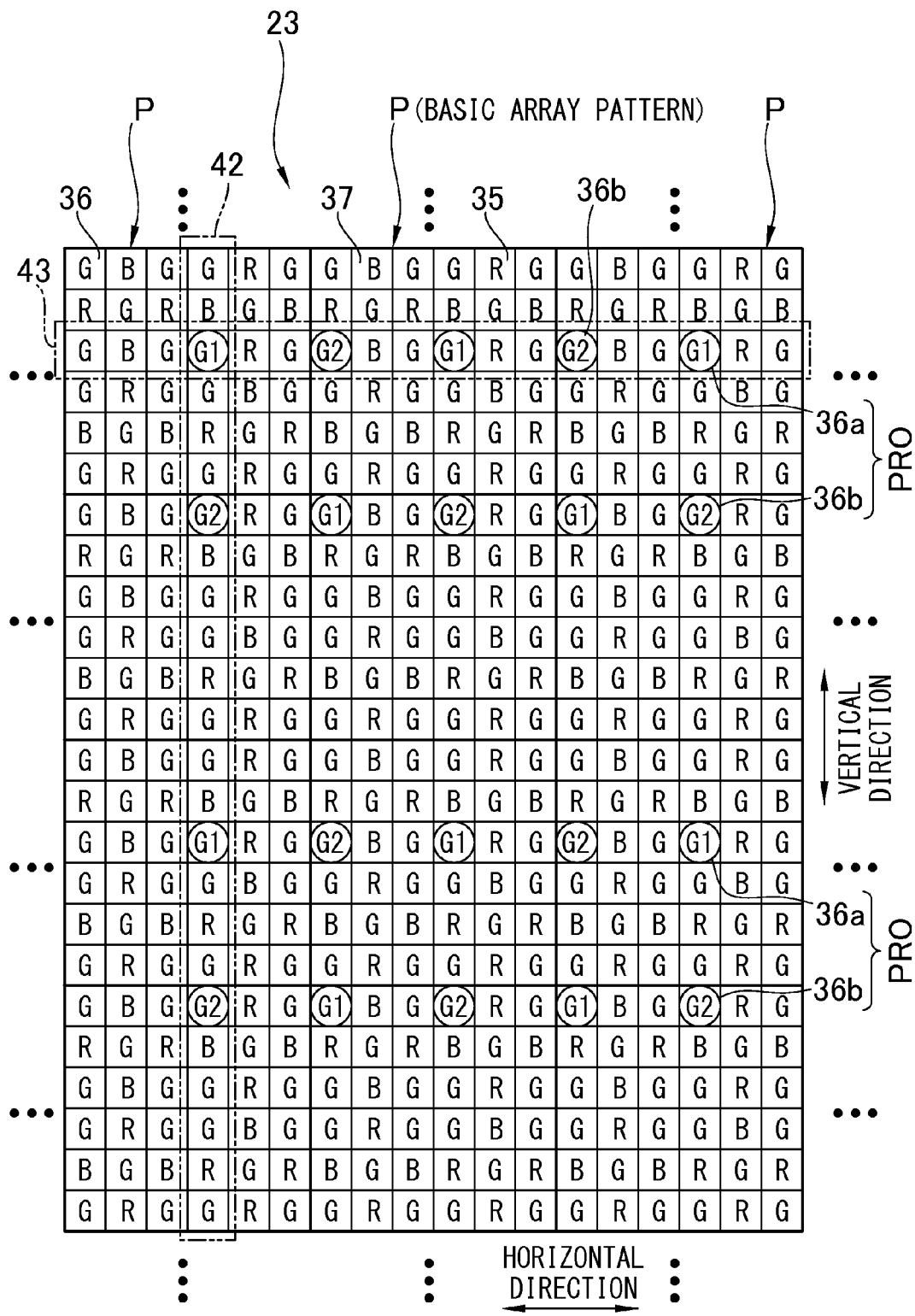
FIG. 4 is a front view of an imaging surface of an imaging element.

As shown in FIG. 4, R pixels 35 of red (R), G pixels 36 of green (G), and B pixels 37 of blue (B) are arranged in a matrix shape on an imaging surface 23a (refer to FIG. 3) of the imaging element 23. Each of the color pixels 35, 36, and 37 is a normal pixel in which subject light to which pupil-split is not applied is imaged, and is composed of a photoelectric conversion element 39 (refer to FIG. 5), and a color filter 40 (refer to FIG. 5) of any one of three primary colors arranged above the photoelectric conversion element 39. That is, each of the color pixels 35 to 37 is also called a non-pupil-split photoelectric conversion element with the color filter 40. The words of "on" and "above" described above are indicated on the basis of a direction (an upward direction in FIG. 5) from a semiconductor substrate 45 toward a micro-lens 49 in FIG. 5.

There are provided color filters 40 of the R color, the G color, and the B color above the photoelectric conversion elements 39 of the R pixels 35, the G pixels 36, and the B pixels 37, respectively.

The imaging element 23 has a color filter array (pixel array) that includes features (1), (2), (3), (4), (5), and (6) described below.

(Feature (1))

The color filter array includes a basic array pattern P of a non-Bayer array composed of a square array pattern corresponding to 6×6 pixels, the basic array pattern P being repeatedly arranged in the horizontal and vertical directions.

As above, since the color filters 40 of R, G, and B are arranged in a predetermined cycle, when synchronization (interpolation) processing (demosaicing processing), or the like is applied to R, G, and B signals read out from the imaging element 23, it is possible to perform the processing in accordance with the repeated pattern, unlike a random arrangement that is conventionally known. In addition, in a case where sub-sampling processing is applied to an image in units of the basic array pattern P to reduce the image, it is possible to allow a color filter array after the sub-sampling processing is applied to be the same as a color filter array before the sub-sampling processing is applied. As a result, a common processing circuit is available.

(Feature (2))

In the color filter array, one or more G color filters corresponding to a color most contributing to acquisition of a luminance signal (G color in the embodiment) are arranged for each of lines in horizontal, vertical, and oblique (oblique upper right and oblique lower left directions, and oblique lower right and oblique left upper directions) directions of the color filter array.

In this manner, since the G color filters are arranged for each of lines in the horizontal, vertical, and oblique directions of the color filter array, it is possible to improve reproducibility of pixel interpolation processing (such as synchronization processing) in a high frequency region regardless of a direction to be a high frequency.

(Feature (3))

In the basic array pattern P, the R pixels 35, the G pixels 36, and the B pixels 37 include 8 pixels, 20 pixels, and 8 pixels, respectively. That is, a ratio of the number of pixels of each of the R, G, and B pixels 35 to 37 is 2:1:12, so that the ratio of the number of G pixels 36 is more than the number of each of the R pixels 35 and the B pixels 37 of another color.

In this manner, the ratio of the number of the G pixels 36 and the ratio of each of the numbers of the R and B pixels 35 and 37 are different, and particularly the ratio of the number of the G pixels 36 most contributing to acquisition of a luminance signal is made more than the ratios of the pixel numbers of the R and B pixels 35 and 37. As a result, it is possible to prevent aliasing when the pixel interpolation processing (such as the synchronization processing) is performed as well as possible to achieve excellent reproducibility in a high frequency.

(Feature (4))

In the color filter array, one or more of each of R and B color filters 40 corresponding to two or more colors other than the G color (R and B colors in this embodiment) are arranged for each of lines in the horizontal and vertical directions of the color filter array in the basic array pattern P.

Since the R and B color filters 40 are arranged for each of the lines in the horizontal and vertical directions in the color filter array, it is possible to reduce occurrence of a color moire (false color). Accordingly, it is possible to eliminate an optical low-pass filter for preventing occurrence of a false color that is to be arranged in an optical path from an incident surface to an imaging surface in an optical system.

Even if the optical low-pass filter is applied, it is possible to apply a filter with a low function of removing a high frequency component to prevent occurrence of a false color so that resolution is not degraded.

(Feature (5))

The color filter array includes a square array corresponding to the G pixels 36 of 2×2 for which the G color filters 40 are provided. The G pixels 36 of 2×2 above are extracted to acquire a difference absolute value of a pixel value of the G pixels 36 in a horizontal direction, a difference absolute value of a pixel value of the G pixels 36 in a vertical direction, and a difference absolute value of a pixel value of the G pixels 36 in an oblique direction, so that it is possible to determine that there is a correlation in any direction of the horizontal direction, the vertical direction, and the oblique direction, in which a difference absolute value is the smallest.

That is, according to the color filter array above, it is possible to discriminate any high correlation direction of the horizontal direction, the vertical direction, and the oblique direction, by using information on the G pixels 36 with a minimum pixel distance. The discrimination result of a direction can be used for the interpolation processing (such as the synchronization processing) of interpolating from peripheral pixels.

(Feature (6))

The basic array pattern P has point symmetry with respect to the center thereof (the center of four G color filters 40). In addition, each of four sub arrays of 3×3 in the basic array pattern P has point symmetry with respect to the G color filter 40 of the center of each of the sub arrays. The symmetry as above enables a processing circuit in a subsequent stage to be reduced in scale or to be simplified.

(Phase Difference Pixel)

There are provided first phase difference pixels 36a (indicated as "G1 in a circle" in FIG. 4) and second phase difference pixels 36b (indicated as "G2 in a circle" in FIG. 4) in some regions (such as a central region) of the imaging surface 23a, instead of some of the G pixels 36. The first phase difference pixels 36a and the second phase difference pixels 36b are alternately provided at intervals for each of a plurality of columns (second pixel columns) 42 and a plurality of rows (first pixel rows) 43 in a pixel array of the imaging element 23 (in FIG. 4, the reference characters are indicated in one representative of each of the columns 42 and the rows 43). In the present specification, columns and rows of the imaging element 23 provided with a phase difference pixel are indicated as reference numerals "42" and "43", respectively.

The "plurality of columns 42" is provided along a horizontal direction (first direction) at an interval of three pixel pitches. In addition, the "plurality of rows 43" is repeatedly provided along a vertical direction (second direction) at intervals of four pixel pitches and eight pixel pitches.

In the present embodiment, the first phase difference pixels 36a and the second phase difference pixels 36b are alternately arranged at an intersection of each of the columns 42 and each of the rows 43 along the horizontal direction and the vertical direction, respectively. In addition, intervals between phase difference pixels of the same type (a first phase difference pixel and a first phase difference pixel, and a second phase difference pixel and a second phase difference pixel) in the vertical direction and the horizontal direction are twelve pixel pitches and six pixel pitches, respectively.

Figure 5:
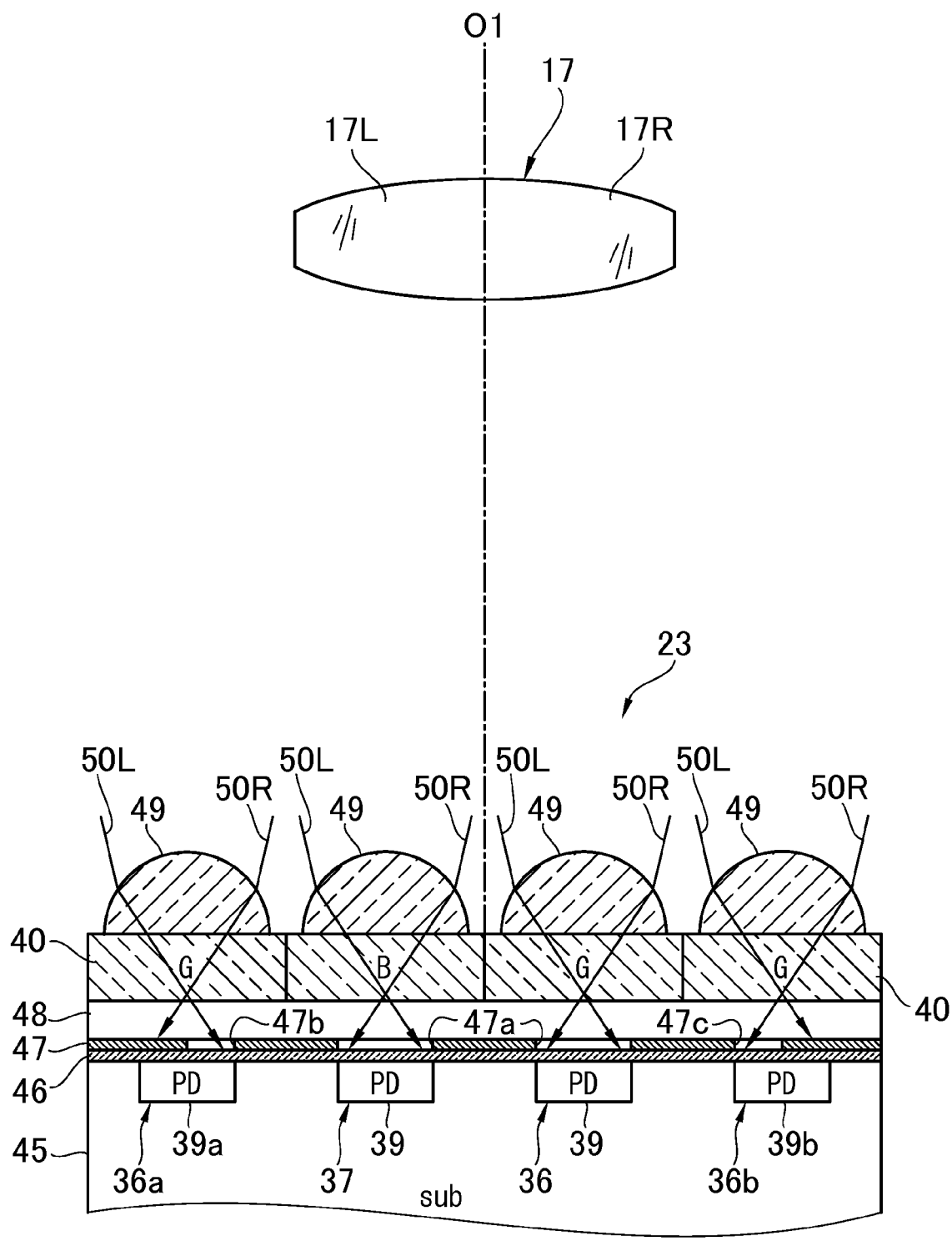
FIG. 5 is a sectional view of the imaging element.

In FIG. 5 showing a section view of the row 43, the photoelectric conversion elements 39 are provided in a surface-layer of the semiconductor substrate (sub) 45 in a matrix shape. In addition, the semiconductor substrate 45 is provided with various circuits (not shown) used for drive of each of pixels and for signal output.

There is provided a light transmissive insulating film 46 on the semiconductor substrate 45, and provided a light-shielding film 47 on the insulating film 46. The light-shielding film 47 is provided with a normal opening 47a, a first eccentric opening 47b, and a second eccentric opening 47c. The first and second eccentric openings 47b and 47c are formed to have an opening diameter smaller than that of the normal opening 47a.

The normal opening 47a is formed above the photoelectric conversion element 39 of each of the R, G, and B pixels 35 to 37. In addition, the center of the normal opening 47a is positioned to coincide with the center of the photoelectric conversion element 39.

The first eccentric opening 47b is formed above the photoelectric conversion element 39a of the first phase difference pixel 36a. The center of the first eccentric opening 47b is deviated from the center of the photoelectric conversion element 39a below the first eccentric opening 47b in a right direction in FIG. 5. Accordingly, an approximate left half of a region (hereinafter referred to as simply a left region) of the photoelectric conversion element 39a of the first phase difference pixel 36a is covered with the light-shielding film 47, and conversely, a central portion of an approximate right half of the region (hereinafter referred to as simply a right region) thereof is exposed.

The second eccentric opening 47c is formed above the photoelectric conversion element 39b of the second phase difference pixel 36b. The center of the second eccentric opening 47c is formed at a position deviated from the center of the photoelectric conversion element 39b below the second eccentric opening 47c in a left direction in FIG. 5. Accordingly, a right region of the photoelectric conversion element 39b of the second phase difference pixel 36b is covered with the light-shielding film 47, and conversely, a central portion of a left region thereof is exposed.

There is provided a light transmissive flattening layer 48 with a flat surface on the light-shielding film 47. On the flattening layer 48, the R, G, and B color filters 40 are provided at positions corresponding to the R, G, and B color pixels 35 to 37, respectively. In addition, the G color filter 40 is provided at each of positions corresponding to first and second phase difference pixels 36a and 36b.

There is provided a micro-lens 49 at a positon on each of the color filters 40 as well as above each of the photoelectric conversion elements 39, 39a, and 39b. In addition, various layers such as a light transmissive flatness layer may be interposed between the color filter 40 and the micro-lens 49.

Subject light 50L incident on the micro-lenses 49 on the R, G, and B pixels 35 to 37 from a left oblique direction in FIG. 5 is condensed on a right region of the photoelectric conversion element 39 by the micro-lens 49. Conversely, subject light 50R incident on the micro-lenses 49 from a right oblique direction in FIG. 5 is condensed on a left region of the photoelectric conversion element 39 by the micro-lens 49. As a result, each of the R, G, and B pixels 35 to 37 has high sensitivity with respect to both of the subject light 50L and the subject light 50R.

The subject light 50L incident on the micro-lens 49 on the first phase difference pixel 36a is condensed on the right region of the photoelectric conversion element 39a through the first eccentric opening 47b by the micro-lens 49. Conversely, since the subject light 50R incident on the micro-lens 49 is shielded by the light-shielding film 47, the subject light 50R is not condensed on the left region of the photoelectric conversion element 39.

The subject light 50R incident on the micro-lens 49 on the second phase difference pixel 36b is condensed on the left region of the photoelectric conversion element 39b by the micro-lens 49 through the second eccentric opening 47c. Conversely, since the subject light 50L incident on the micro-lens 49 is shielded by the light-shielding film 47, the subject light 50L is not condensed on the left region of the photoelectric conversion element 39. As a result, the light-shielding film 47 serves as a pupil-split section that performs pupil-split. Instead of allowing the light-shielding film 47 (each of the eccentric openings 47b and 47c) to serve as the pupil-split section, the micro-lens 49 may be configured to be eccentric.

Subject light that has passed through a left region 17L and a right region 17R of the photographic lens 17 (the zoom lens 15 and the focus lens 16) is indicated as the subject light 50L and 50R, respectively. In order to prevent a drawing from being complicated, both of the lenses 15 and 16 are integrally shown, and each of the photographic lens 17 and the imaging element 23 is shown with a size different from an actual size.

The light-shielding film 47 applies pupil-split to subject light incident on the imaging element 23, so that the first phase difference pixel 36a has high sensitivity with respect to the subject light 50L, and conversely the second phase difference pixel 36b has high sensitivity with respect to the subject light 50R.

(Types of Pixel of Imaging Element (Photoelectric Conversion Element with Color Filter))

The imaging element 23 of the present example includes: the plurality of first phase difference pixels 36a (hereinafter referred to as a "first pixel")and the plurality of second phase difference pixels 36b (hereinafter referred to as a "second pixel") on which subject light (the subject light 50L and the subject light 50R) which has passed through separate regions (the left region 17L and the right region 17R) of the photographic lens 17, and to which subject light pupil-split is applied, are incident, respectively; and the plurality of normal pixels (the R pixels 35, the G pixels 36, and the B pixels 37) (hereinafter referred to as a "third pixel") in which a subject image to which the pupil-split is not applied is imaged.

Hereinafter, image processing in the image processing circuit 29 will be described by using terms of the "first pixel", the "second pixel", and the "third pixel" described above, for convenience of explanation.

(Configuration of Image Processing Circuit)

Figure 6:
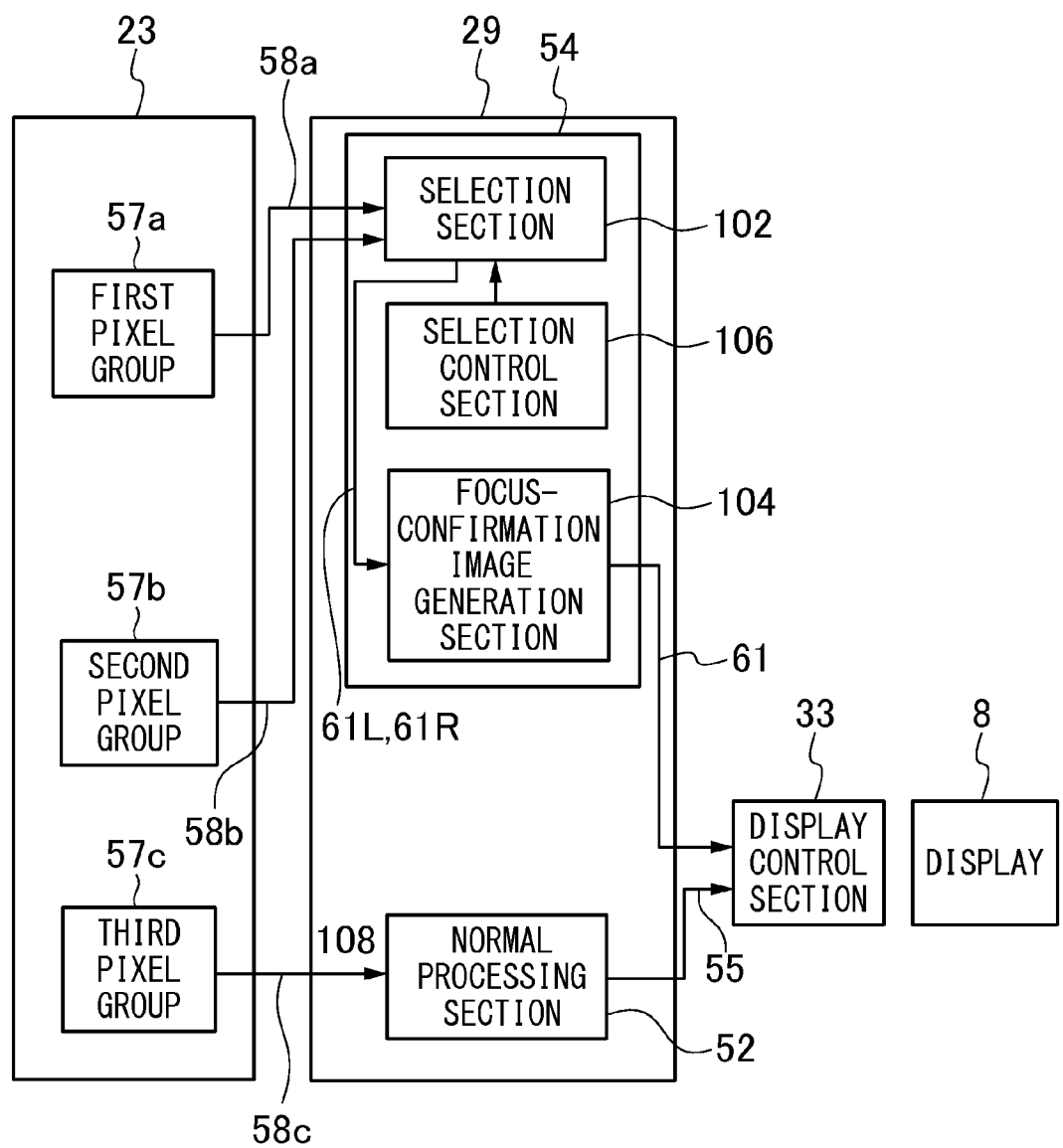
FIG. 6 is a block diagram of image processing of digital cameras of first to fifth embodiments.

As shown in FIG. 6, the image processing circuit 29 is composed of a normal processing section 52, and a split image processing section 54. The split image processing section 54 is composed of a selection section 102, a focus-confirmation image generation section 104, and a selection control section 106.

The normal processing section 52 applies image processing to a normal image 58c (third image) that is an output signal (output) of a third pixel group 57c composed of the plurality of third pixels (the R pixels 35, the G pixels 36, and the B pixels 37), and outputs the normal image 58c to which the image processing is applied, as a photographed image 55 of color. In addition, the normal image 58c may be called a "first image for display" in the present specification.

The split image processing section 54 generates a split image 61 of monochrome on the basis of a first image 58a (also called a "first phase difference image") that is an output signal (output) of a first pixel group 57a composed of the plurality of first pixels (first phase difference pixels 36a), and a second image 58b (also called a "second phase difference image") that is an output signal (output) of a second pixel group 57b composed of the plurality of second pixels (second phase difference pixels 36b). In addition, the split image 61 may be called a "focus-confirmation image" or a "second image for display" in the present specification.

Figure 8:
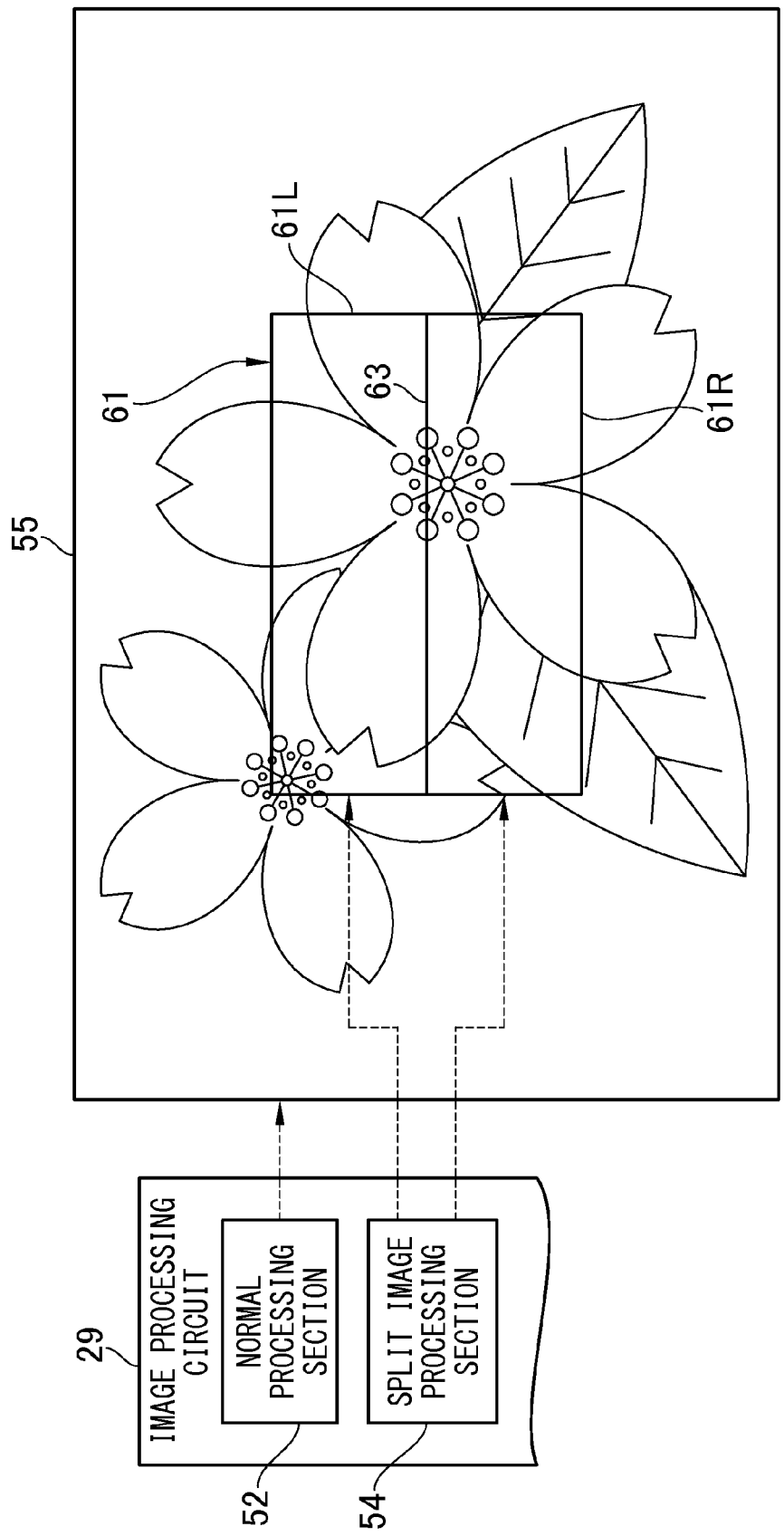
FIG. 8 is a schematic illustration of a focus-confirmation image in a state where a focus lens is set at an in-focus position.
Figure 9:
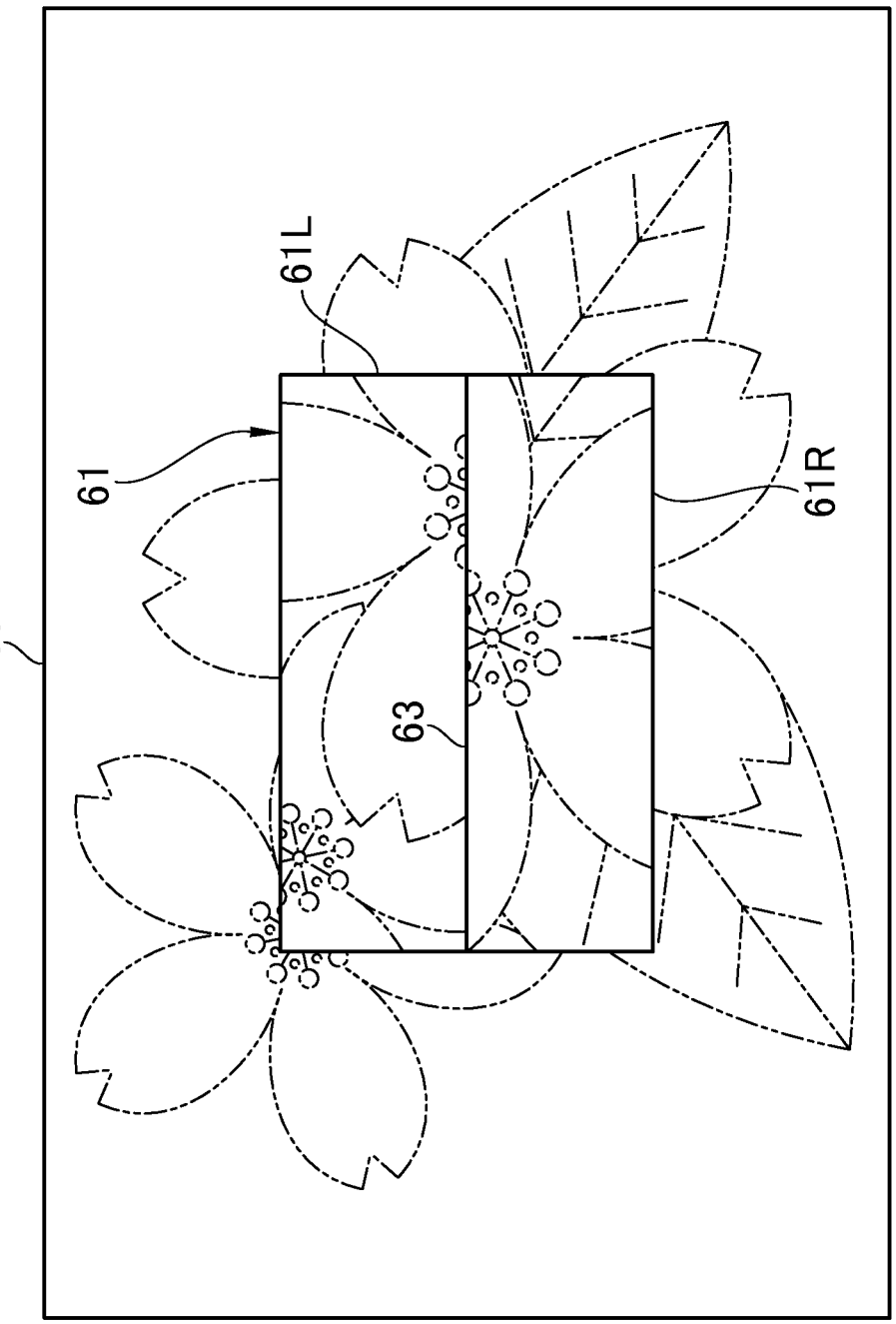
FIG. 9 is a schematic illustration of a focus-confirmation image in a state where the focus lens is not set at an in-focus position.

As shown in FIGS. 8 and 9, the selection section 102 selects any one of the first image 58a and the second image 58b for each of a plurality of divisions (a region of a first split image 61L, and a region of a second split image 61R) in a split image 61 (focus-confirmation image) divided by a split line 63 (may be called a "boundary line" or simply a "boundary" in the present specification). That is, the selection section 102 of the present example extracts display portions (the first split image 61L and a second split image 61R) constituting the split image 61 from the first image 58a that is the output signal of the first pixel group 57a composed of the plurality of first pixels 36a, and the second image 58b that is the output signal of the second pixel group 57b composed of the plurality of second pixels 36b, respectively.

The "split line" in the present specification is only a "boundary" between the display portion (first split image 61L) of the first image 58a and the display portion (second split image 61R) of the second image 58b in the split image 61, but is not a line that is indicated in the split image 61 to show the boundary therebetween.

Figure 7:
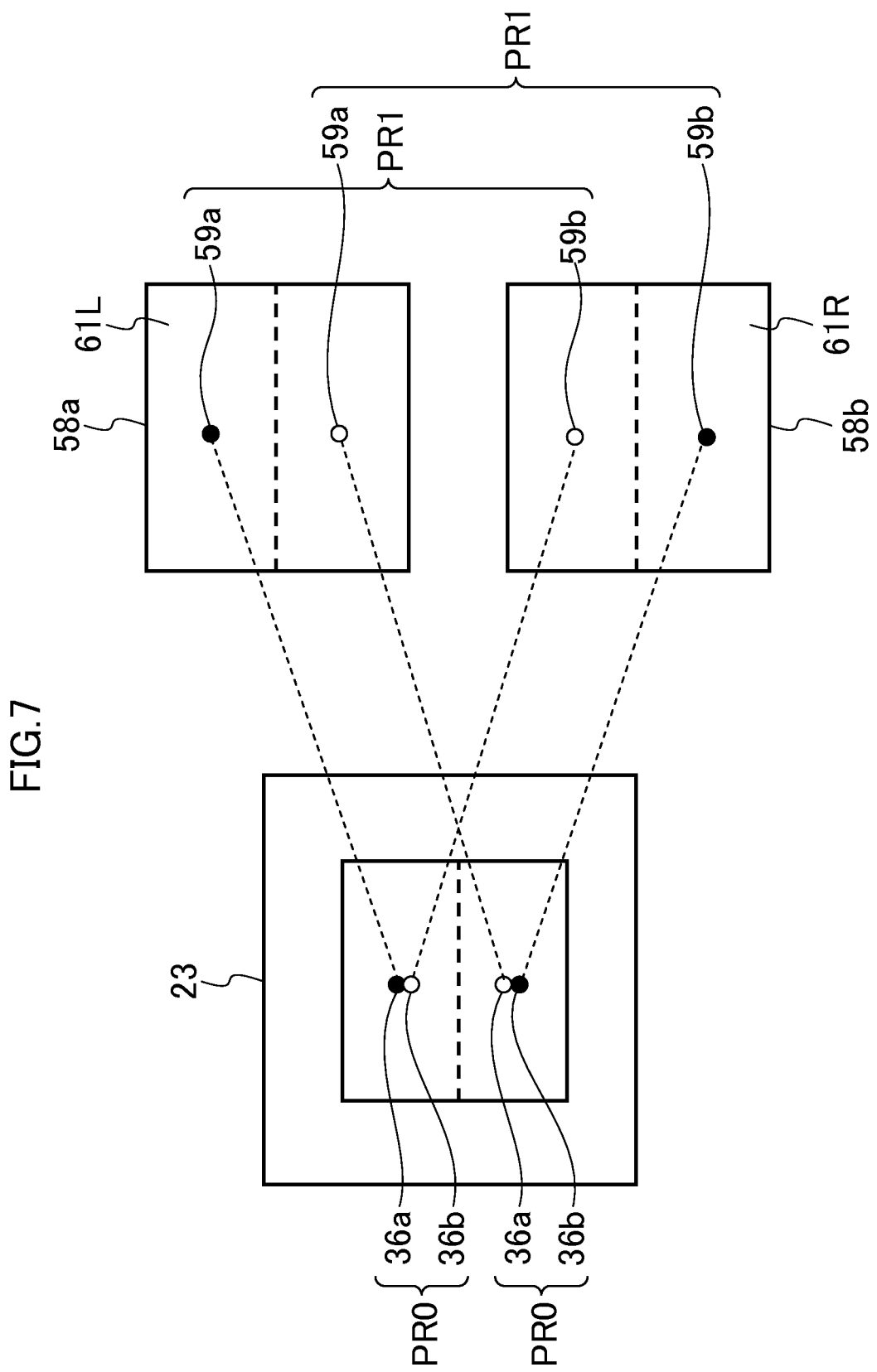
FIG. 7 is an illustration used for describing selection of a pixel by a selection section.

Specifically, as shown in FIG. 7, the selection section 102 selects any one of pixel values of a pixel 59a of the first image 58a (with a pixel value of the first pixel 36a of the imaging element 23) and a pixel 59b of the second image 58b (with a pixel value of the second pixel 36b of the imaging element 23), the pixels 59a and 59b constituting each of the pair pixels PR1, to generate the split image 61, for each of pair-pixels PR1 of the first image 58a and the second image 58b outputted from the first pixel group 57a and the second pixel group 57b of the imaging element 23, respectively. The selection above is equivalent to selection in which the selection section 102 selects any one of the first pixel 36a and the second pixel 36b for each of pair pixels PR0 of the imaging surface 23a of the imaging element 23 so that a pixel value of the selected pixel is used to generate the split image 61. Here, the respective pair pixels PR1 between the first image 58a and the second image 58b correspond to the respective pair pixels PR0 in the imaging surface 23a of the imaging element 23.

As shown in FIGS. 8 and 9, the focus-confirmation image generation section 104 generates the split image 61 by using the display portion (first split image 61L) extracted from the first image 58a by the selection section 102, and the display portion (second split image 61R) extracted from the second image 58b by the selection section 102.

The selection control section 106 changes a position of the split line 63 that is a boundary line between the first image 58a and the second image 58b in the split image 61 (focus-confirmation image), in a direction orthogonal to the split line 63. In addition, the selection control section 106 of the present example includes a function of changing the number of the split lines 63 and a shape thereof.

The selection section 102 constitutes the "selection device" in the present invention. In addition, the selection control section 106 constitutes the "boundary change device" in the present invention. Further, the focus-confirmation image generation section 104 constitutes the "image generation device" in the present invention.

(Split Image)

As shown in FIG. 8, the split image processing section 54 (specifically, the focus-confirmation image generation section 104) generates a first split image 61L of monochrome (a display portion of the first image 58a) of an upper half of a central region of a subject in FIG. 8 as viewed from an L (left) viewpoint side on the basis of a luminance component of an output signal (output) from the first pixel group 57a. In addition, the split image processing section 54 generates a second split image 61R of monochrome (a display portion of the second image 58b) of a lower half of a central region of the subject in FIG. 8 as viewed from an R (right) viewpoint side on the basis of a luminance component of an output signal (output) from the second pixel group 57b. Accordingly, the split image 61 of monochrome including the first split image 61L and the second split image 61R is obtained. The first and second split images 61L and 61R are arranged in the split image 61 so as to be adjacent to each other across the split line 63 (also called a "boundary line") parallel to a horizontal direction. In FIG. 8, the split image 61 is superimposed on the photographed image 55 of color to allow the split image 61 to be easily grasped, and the superimposition is performed in the display control section 33.

The photographed image 55 and the split image 61 are temporarily stored in the VRAM region in the memory 13. The display control section 33 reads out the photographed image 55 and the split image 61 from the memory 13, and outputs the images to the display 8 after superimposing the split image 61 on the photographed image 55. Accordingly, a user can view a live view image in which the split image 61 of monochrome is displayed in a display area of the photographed image 55 of full color.

The first split image 61L that is a display portion of the first image 58a and the second split image 61R that is a display portion of the second image 58b shift in a lateral direction (horizontal direction (first direction)) in FIG. 8 depending on a focusing state of the focus lens 16. The amount of deviation between first and second split images 61L and 61R at the time corresponds to the amount of deviation of focusing of the focus lens 16. That is, the lateral direction in FIG. 8 is a phase difference direction corresponding to a direction of deviation between images of respective subject light beams imaged on the imaging surface 23a by the photographic lens 17. The amount of deviation between the first and second split images 61L and 61R is zero (including almost zero) when the focus lens 16 is in focus.

As shown in FIG. 9, as the amount of out-of-focus of the focus lens 16 increases, the amount of deviation between the first split image 61L and the second split image 61R also increases. Accordingly, a user can adjust focus while checking a live view image. In FIG. 9, a subject that is out of focus is indicated by a two-dot chain line.

In FIGS. 8 and 9, there is shown an example of a case where the split image 61 (second image for display) that is a focus-confirmation image is displayed in a display area of the photographed image 55 (first image for display) based on the normal image 58c outputted from the third pixel group 57c, however, only the split image 61 may be displayed in the display 8. That is, all pixels of the imaging element 23 may be phase difference pixels (the first phase difference pixel and the second phase difference pixel), or the phase difference pixels (the first phase difference pixel and the second phase difference pixel) may be arranged in the whole region of the imaging element 23 at a fixed ratio so that only the split image 61 is displayed in the display 8.

(Another Configuration)

The digital camera 2 is provided with an AF detection circuit for autofocus and the like (not shown). The AF detection circuit analyzes an image composed of an output signal of the first pixel 36a and an image composed of an output signal of the second pixel 36b to detect a direction of deviation between both of the images and the amount thereof, thereby acquiring the amount of focus adjustment of the photographic lens 17 (also called the amount of defocus). The CPU 11 controls the lens driver 25 on the basis of the amount of focus adjustment to allow the focus mechanism 20 to drive the focus lens 16, thereby adjusting focus. Since AF processing by a phase difference method described above is well known, hereinafter a specific description thereof is omitted.

In addition, the digital camera 2 is provided with an AE detection circuit and the like (not shown). The CPU 11 drives the mechanical shutter 18 through the lens driver 25 on the basis of a detection result of the AE detection circuit to perform AE processing.

(Flow of Entire Photographing Processing)

Figure 10:
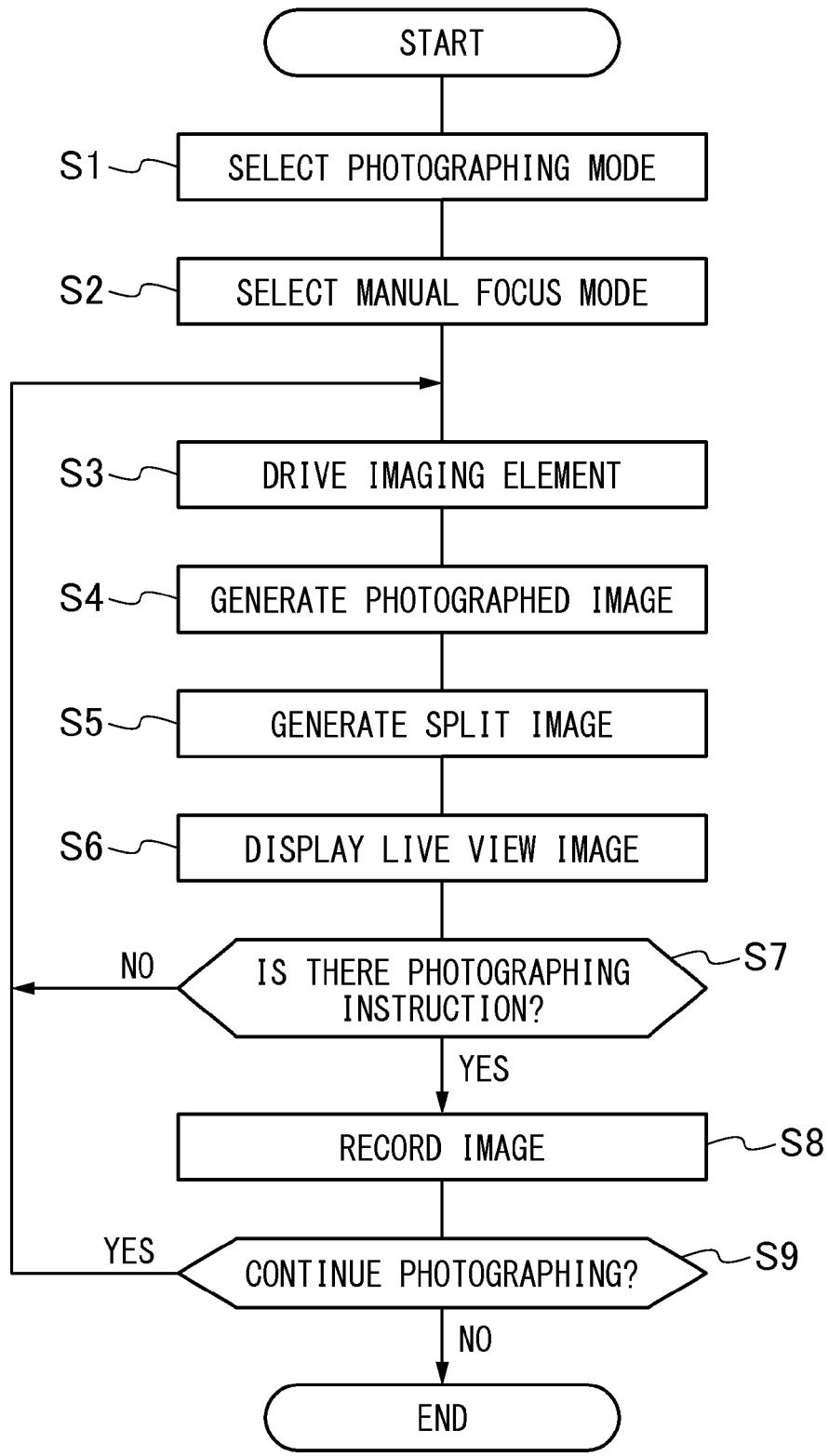
FIG. 10 is a flow chart showing a flow of photographing processing in the digital camera.

Next, with reference to FIG. 10, operation of the digital camera 2 of the configuration above will be described. When the digital camera 2 is set at an AF mode or an MF mode (step S2) of a photographing mode (step S1) in the operation section 9, the CPU 11 controls operation of the mechanical shutter 18 through the lens driver 25 as well as drives the imaging element 23 through the imaging element driver 27 (step S3). Since operation of the digital camera 2 when the AF mode is set is well known, hereinafter a specific description thereof is omitted.

When the MF mode (step S2) is set, output signals from the third pixels 35, 36, and 37 (normal pixels) of the imaging element 23 is inputted into the normal processing section 52 of the image processing circuit 29. The normal processing section 52 applies image processing to the normal image 58c composed of the output signals from the third pixels 35 to 37 to store the normal image 58c in the VRAM region in the memory 13 as the photographed image 55 of full color (step S4).

In addition, the selection section 102 selects any one of the first image 58a and the second image 58b for each of a plurality of divisions (a region of the first split image 61L, and a region of the second split image 61R) in the split image 61 (focus-confirmation image) divided by the split line 63. That is, the selection section 102 extracts the first split image 61L and the second split image 61R, to be used for a focus-confirmation image, from the first image 58a and the second image 58b, respectively. Further, the focus-confirmation image generation section 104 generates the split image 61 including the first split image 61L of monochrome and the second split image 61R of monochrome (step S5). The generated split image 61 is stored in the VRAM region in the memory 13. When received an instruction to change a position of the boundary line (split line 63) between the first split image 61L and the second split image 61R in the split image 61 or the number thereof from the operation section 9, the selection control section 106 allows the selection section 102 to change a range of each of the divisions in the split image 61, thereby changing the position of the boundary line (split line) between the first split image 61L and the second split image 61R in the split image 61 or the number thereof.

Change of a position of the boundary line, or of the number thereof, will be described later.

The display control section 33 reads out the photographed image 55 and the split image 61 from the memory 13, and outputs the images to the display 8 after superimposing the split image 61 in a display area of the photographed image 55. Accordingly, as shown in FIG. 9, a live view image including the split image 61 of monochrome is displayed in the photographed image 55 of color in the display 8 (step S6).

Since the first split image 66L and the second split image 66R in the split image 61 shift in the lateral direction in FIG. 9 depending on a focusing state of the focus lens 16, a user rotates the focus ring 3a to move the focus lens 16 along the optical axis direction. As the focus lens 16 comes close to an in-focus position where focused on a subject, the amount of deviation between the first split image 66L and the second split image 66R gradually decreases. Accordingly, a user can adjust focus while checking a live view image.

When the focus lens 16 is set at the in-focus position, the amount of deviation between the first split image 66L and the second split image 66R becomes zero. Accordingly, the focus lens 16 is focused on the subject to finish focus adjustment. Subsequently, processing described above is repeatedly performed until the shutter button 6 is pressed.

It is determined whether a photographing instruction is received by pressing of the shutter button 6 (Yes at step S7), and if the photographing instruction is received (Yes at step S7), the photographed image 55 for one frame is generated in the normal processing section 52, and is temporarily stored in the VRAM region in the memory 13. The photographed image 55 is compressed in the compression and expansion processing circuit 31, and then is recorded in the memory card 10 through the medium I/F 32 (step S8). Subsequently, processing described above is repeatedly performed until it is determined whether to continue photographing after the MF mode is ended (step S9), and the MF mode is ended.

Hereinafter, details of change of the split line 63 (boundary line) in the split image 61 (focus-confirmation image) will be described for each of various embodiments.

(Digital Camera of First Embodiment)

In the digital camera 2 of a first embodiment, the selection control section (designated by reference numeral 106 in FIG. 6) changes a position of the split line 63 (boundary line) in the split image 61 (focus-confirmation image) displayed in the display 8 in accordance with an instruction to change a position, inputted into the operation section 9 (position input device).

(Example of Focus-Confirmation Image Display Processing of First Embodiment)

Figure 11:
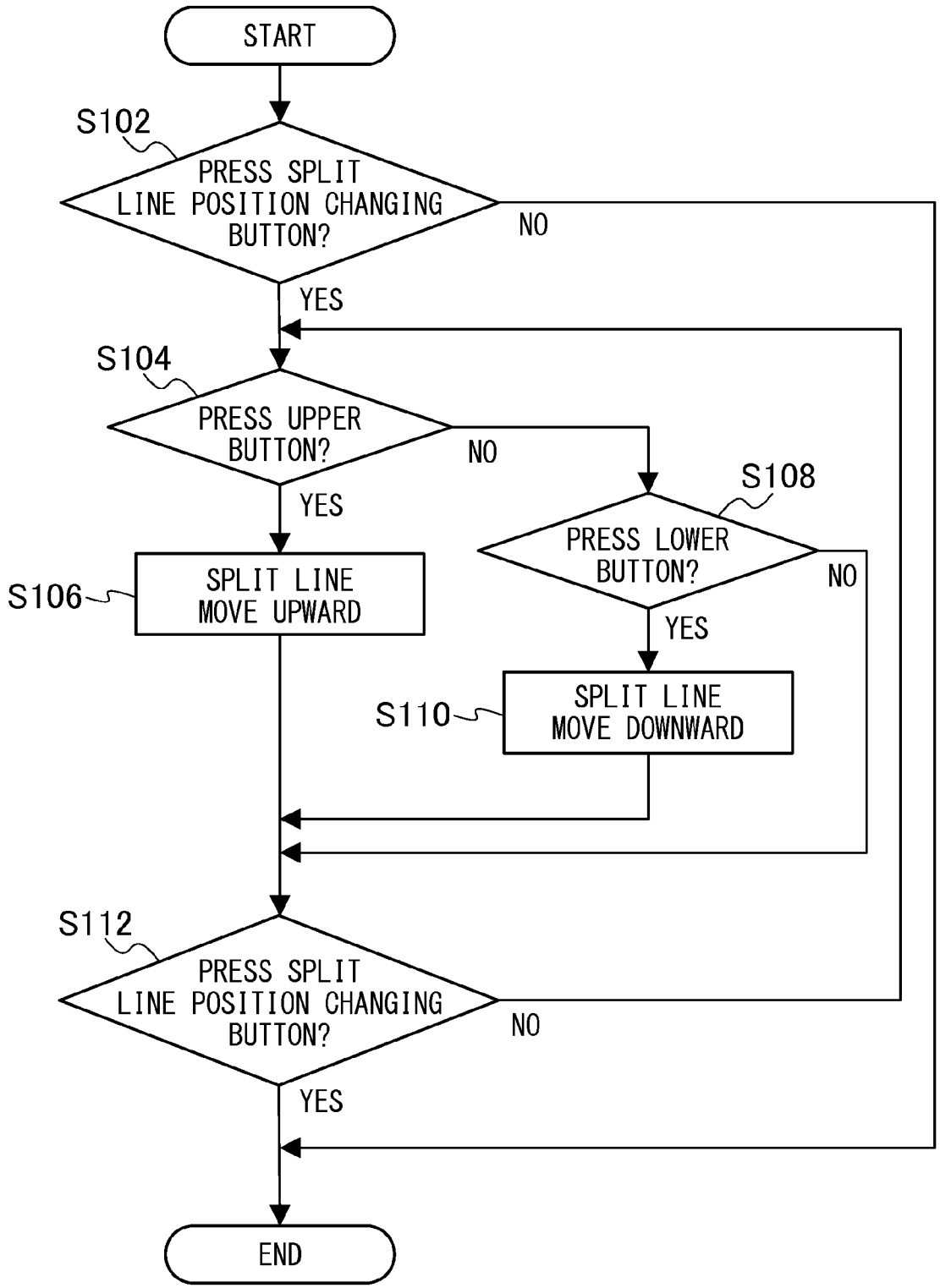
FIG. 11 is a flow chart showing a flow of an example of focus-confirmation image display processing in a first embodiment.

FIG. 11 is a flow chart showing a flow of an example of focus-confirmation image display processing in the first embodiment. The present processing is performed by control of the CPU 11 constituting the selection control section 106 in accordance with a program.

In the present example, the operation section 9 shown in FIG. 3 is provided with a split line position changing button, an upper button, and a lower button. In a case where the display 8 is a touch panel type, the display of a touch panel type may be used as position input device.

First, it is determined whether the split line position changing button is pressed or not (step S102).

In a case where the split line position changing button is pressed (Yes at step S102), it is determined further whether the upper button is pressed or not (step S104), and whether the lower button is pressed or not (step S108).

In a case where the split line position changing button is pressed (Yes at step S102), and further the upper button is pressed (yes at step S104), the split line 63 is moved upward in the split image 61 (step S106).

In addition, in a case where the split line position changing button is pressed (Yes at step S102), and further the lower button is pressed (yes at step S108), the split line 63 is moved downward in the split image 61 (step S110).

Next, it is determined whether the split line position changing button is pressed again or not (step S112), and step S104 to S112 is repeated until the split line position changing button is pressed again. In a case where the split line position changing button is pressed again (yes at step S112), the present processing is ended.

Figure 12:
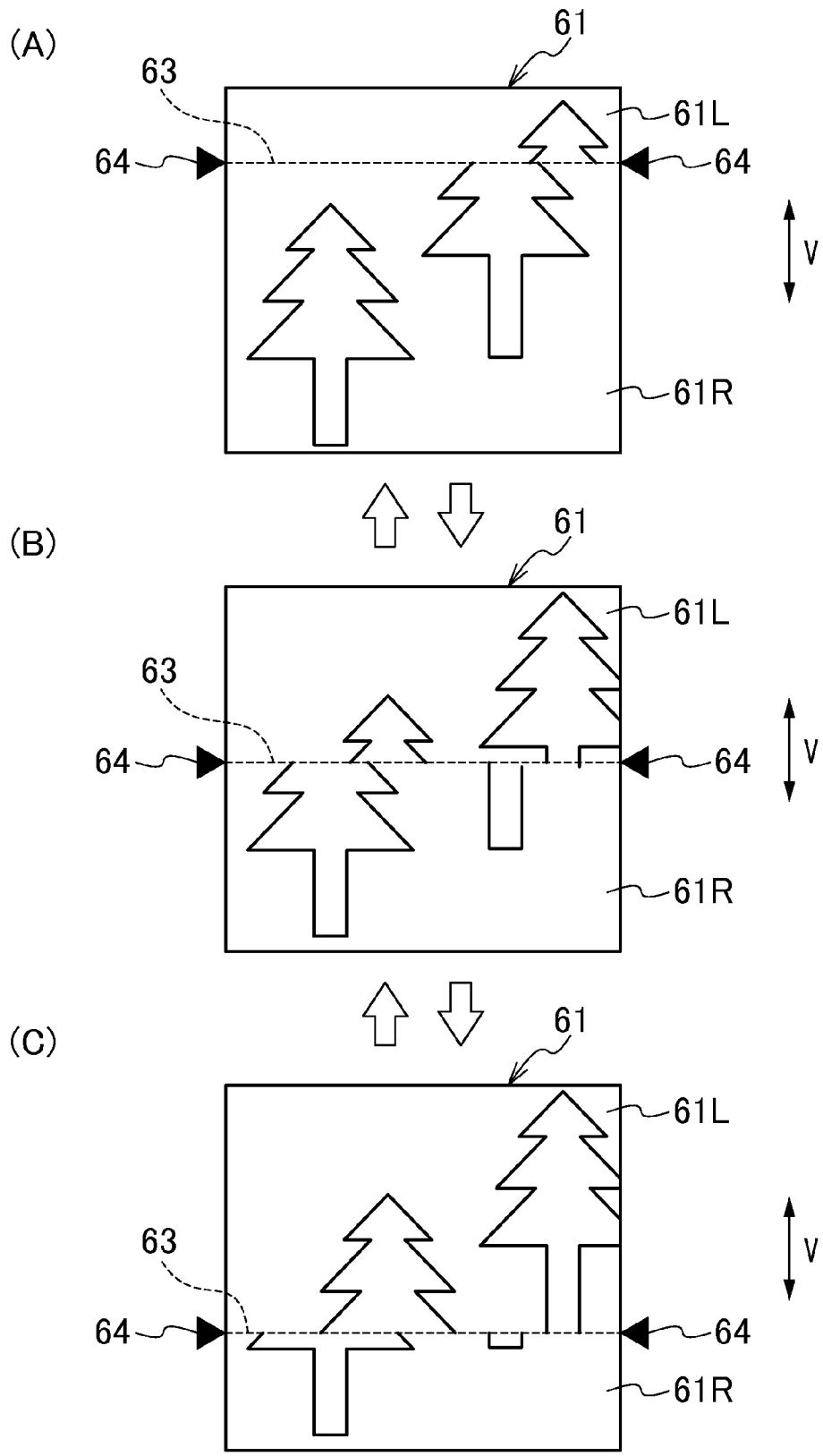
FIG. 12 is an illustration used for describing change of a position of a boundary line in an example of a focus-confirmation image in the first embodiment.

FIG. 12 shows a state where a position of the split line 63 is changed by pressing the upper button and the lower button.

As shown in a portion (B) in FIG. 12, if the upper button is continuously pressed in a state where a position of the split line 63 is set at the center in a vertical direction V (a direction orthogonal to the split line 63) in the split image 61, as shown in a portion (A) in FIG. 12, the position of the split line 63 changes from the center in the vertical direction V in the split image 61 to an upward direction. In addition, if the lower button is continuously pressed in a state shown in the portion (B) in FIG. 12, as shown in a portion (C) in FIG. 12, the position of the split line 63 changes from the center in the vertical direction V in the split image 61 to a downward direction.

Further, the display control section 33 allows a split line mark 64 that is an index showing a position of the split line 63 to be indicated near the split line 63. The display control section 33 of the present example allows the split line mark 64 to be indicated in an extension line of the split line 63. The display control section 33 changes an indication position of the split line mark 64 in the vertical direction V in accordance with change of the position of the split line 63. A shape of the split line mark 64 is not particularly limited. In addition, an indication position of the split line mark 64 is not limited to an example of the positon shown in FIG. 12.

(Operation Effect of Digital Camera of First Embodiment)

Figure 13:
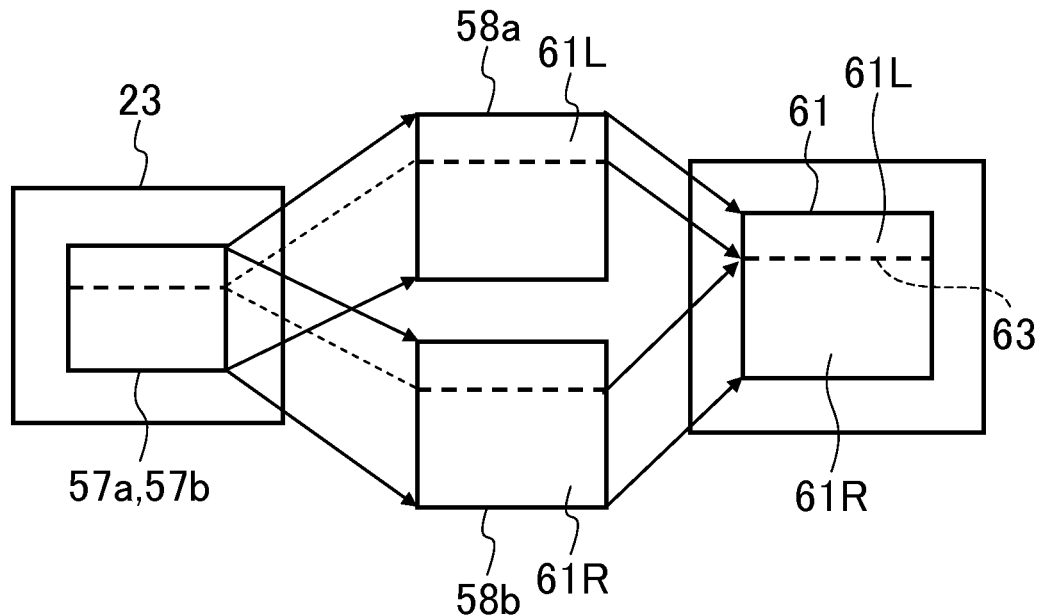
FIG. 13 is a first illustration used for describing selection of a pixel in the first embodiment.
Figure 14:
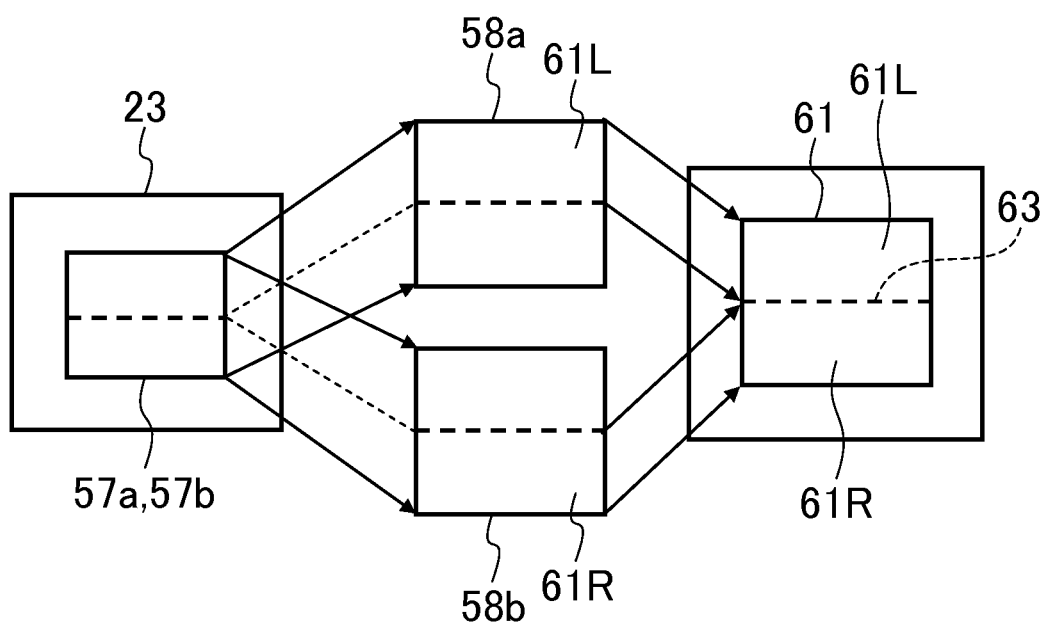
FIG. 14 is a second illustration used for describing selection of a pixel in the first embodiment.
Figure 15:
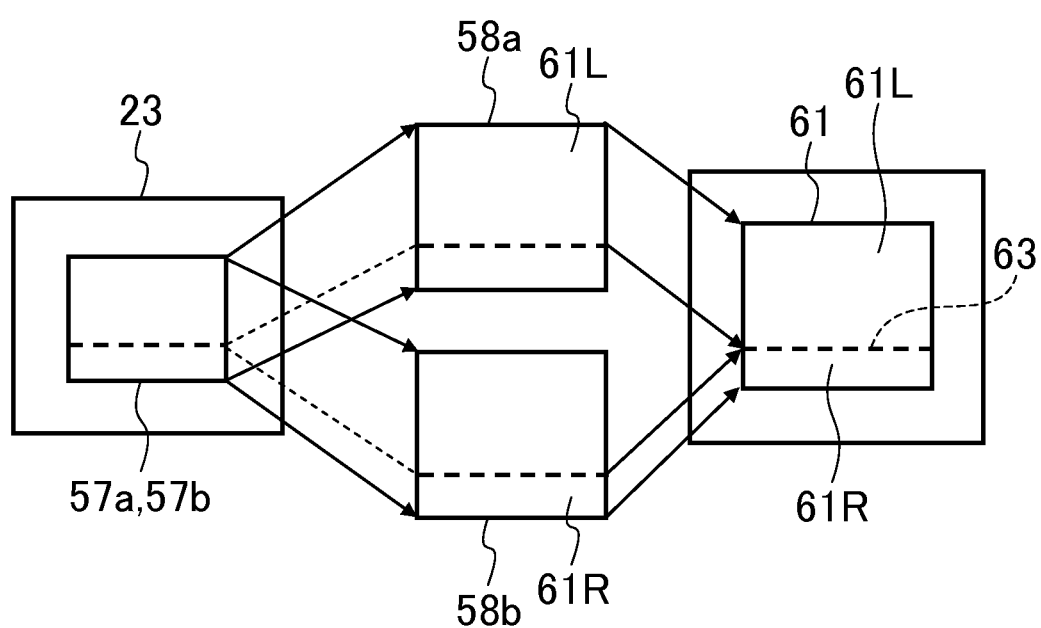
FIG. 15 is a third illustration used for describing selection of a pixel in the first embodiment.

FIGS. 13, 14, and 15 are illustrations that schematically show states of selection control corresponding to the portions (A), (B), and (C) in FIG. 12, respectively. The selection section 102 acquires the first image 58a and the second image 58b outputted from the first pixel group 57a and the second pixel group 57b of the imaging element 23, respectively, to extract display portions (the first split image 61L and the second split image 61R) used for the split image 61 from the first image 58a and the second image 58b, respectively. That is, the selection section 102 selects any one of the first image 58a and the second image 58b for each of a plurality of divisions divided by the split line 63 in the split image 61. The focus-confirmation image generation section 104 generates the split image 61 by combining the first split image 61L and the second split image 61R extracted by the selection section 102 so that the images are adjacent to each other. The selection control section 106 allows the selection section 102 to change a position of the split line 63 that is a boundary line between the first image 58a and the second image 58b in the split image 61 in the vertical direction V orthogonal to the split line 63 in accordance with an instruction to change a position inputted into the operation section 9 (position input device). That is, the selection section 102 selects any one of the first phase difference pixel 36a and the second phase difference pixel 36b from each of pair pixels PO in accordance with the instruction of the selection control section 106, and generates the split image 61 by using a pixel value of each of the selected phase difference pixels. Accordingly, a position of the split line 63 in the split image 61 displayed in the display 8 changes in accordance with the instruction to change a position inputted into the operation section 9 (position input device). Thus, a user can adjust focus (focusing) at a pinpoint by changing a position of the split line 63 in the split image 61 to set the split line 63 at a position where adjusting focus (focusing) is required.

(Digital Camera of Second Embodiment)

In the digital camera 2 of a second embodiment, the selection control section (designated by reference numeral 106 in FIG. 6) changes the number of the split lines 63 (boundary lines) in the split image 61 (focus-confirmation image) displayed in the display 8 in accordance with an instruction to change the number, inputted into the operation section 9 (number input device).

(Example of Focus-Confirmation Image Display Processing of Second Embodiment)

Figure 16:
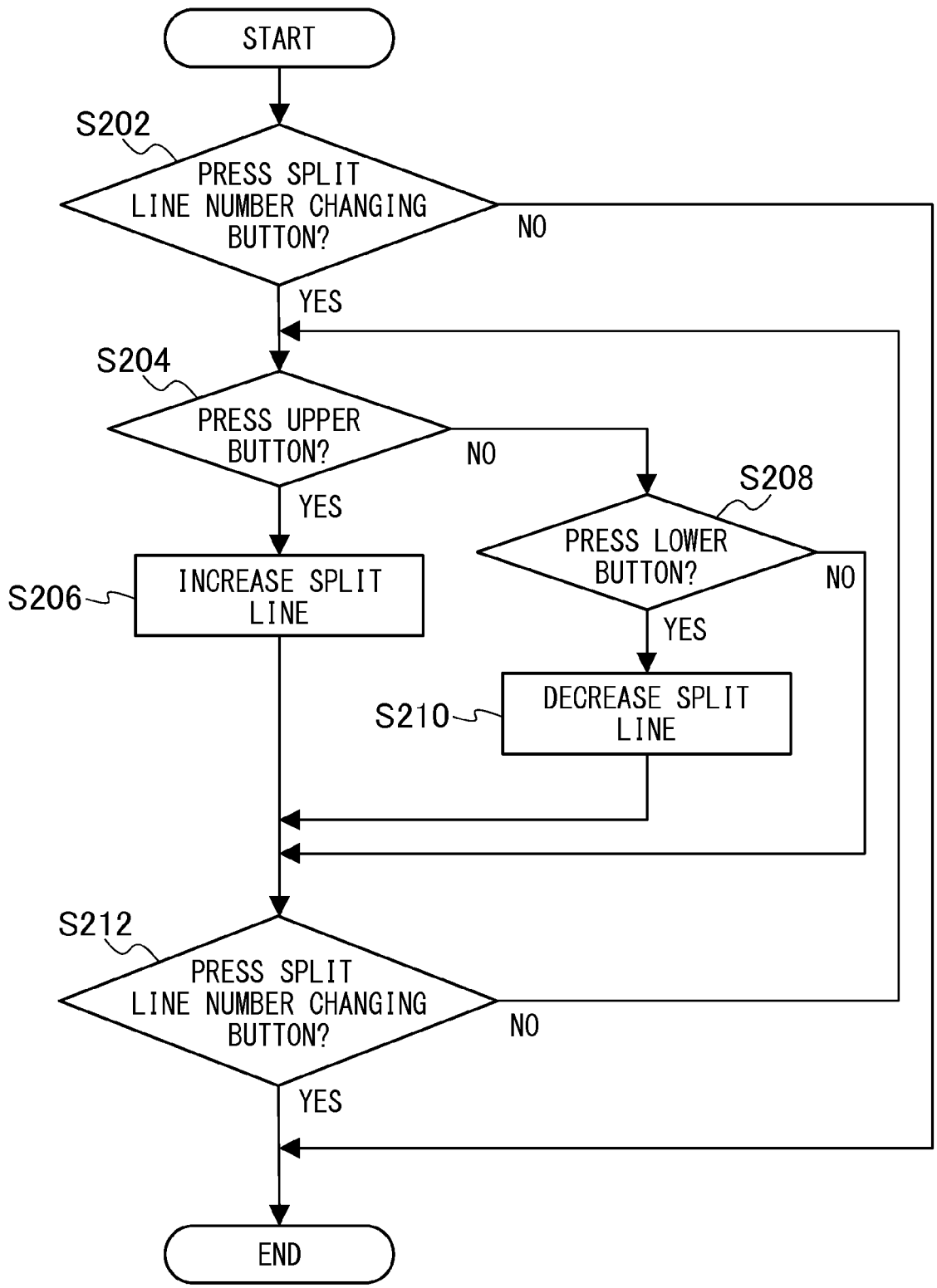
FIG. 16 is a flow chart showing a flow of an example of focus-confirmation image display processing in a second embodiment.

FIG. 16 is a flow chart showing a flow of an example of focus-confirmation image display processing in the second embodiment. The present processing is performed by control of the CPU 11 constituting the selection control section 106 in accordance with a program.

In the present example, the operation section 9 shown in FIG. 3 is provided with a split line number changing button, an upper button, and a lower button. In a case where the display 8 is a touch panel type display, the display of a touch panel type may be used as number input device.

First, it is determined whether the split line number changing button is pressed or not (step S202).

In a case where the split line number changing button is pressed (Yes at step S202), it is determined further whether the upper button is pressed or not (step S204), and whether the lower button is pressed or not (step S208).

In a case where the split line number changing button is pressed, and further the upper button is pressed (yes at step S204), the number of the split lines 63 is increased by one line (step S206).

In addition, in a case where the split line number changing button is pressed (Yes at step S202), and further the lower button is pressed (yes at step S208), the number of the split lines 63 is decreased by one line (step S210).

Next, it is determined whether the split line number changing button is pressed again or not (step S212), and step S204 to S212 is repeated until the split line number changing button is pressed again. In a case where the split line number changing button is pressed again (yes at step S212), the present processing is ended.

Figure 17:
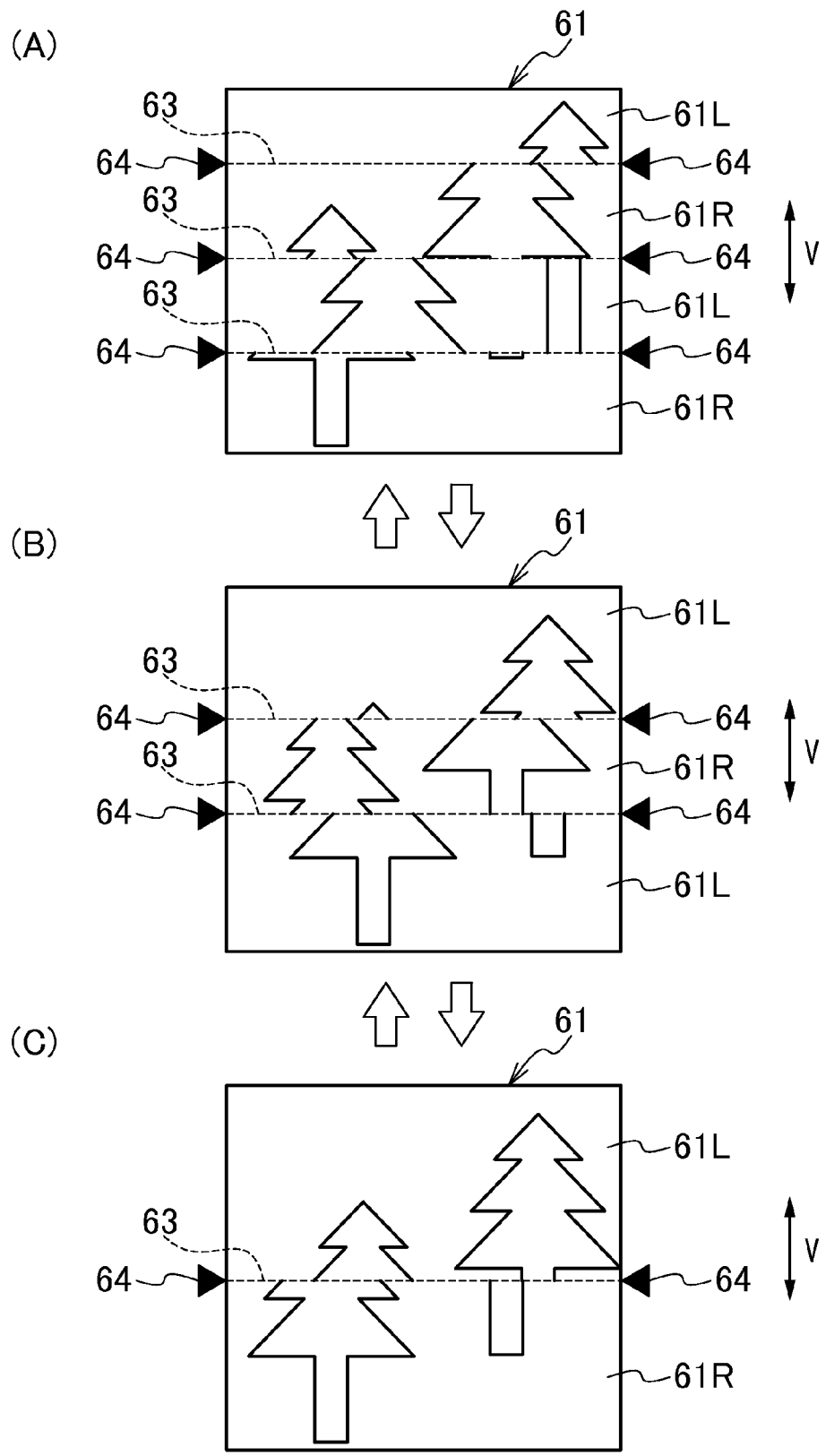
FIG. 17 is an illustration used for describing change of the number of boundary lines of an example of a focus-confirmation image in the second embodiment.

FIG. 17 shows a state where the number of the split lines 63 is increased and decreased by pressing the upper button and the lower button.

As shown in a portion (B) in FIG. 17, if the upper button is pressed once in a state where the number of the split lines 63 is set at two, as shown in a portion (A) in FIG. 17, the number of the split lines 63 in the split image 61 increases by one to three. In addition, if the lower button is pressed once in a state shown in the portion (B) in FIG. 17, as shown in a portion (C) in FIG. 17, the number of the split lines 63 in the split image 61 decreases by one to one.

Further, the display control section 33 allows a split line mark 64 that is an index showing a position of the split line 63 (boundary line) to be indicated near the split line 63. The display control section 33 increases and decreases the number of the split line marks 64 in accordance with increase and decrease in the number of the split lines 63.

(Operation Effect of Digital Camera of Second Embodiment)

In the digital camera 2 of the present embodiment, the selection control section 106 changes the number of the split lines 63 in the split image 61 displayed in the display 8 in accordance with an instruction to change the number, inputted into the operation section 9 (number input device). Accordingly, a user can adjust focus (focusing) at a plurality of positions by changing the number of the split lines 63 in the split image 61 to set the split lines 63 at the plurality of positions.

Third Embodiment

In the digital camera 2 of a third embodiment, in a case where the number of the split lines 63 (boundary line) inputted by manual operation is indicated as L, the selection control section (designated by reference numeral 106 in FIG. 6) allows the operation section 9 (number input device) to accept only the L of an odd number, and to position the split line 63 in a place of (L+1)/2 of the number L of the split lines 63 at the center or near the center of the split image 61 (focus-confirmation image).

Here, "near the center" means a position from the center of the split image 61 within ±5% of an overall width of the split image 61 in the vertical direction V, for example.

(Example of Focus-Confirmation Image Display Processing of Third Embodiment)

Figure 18:
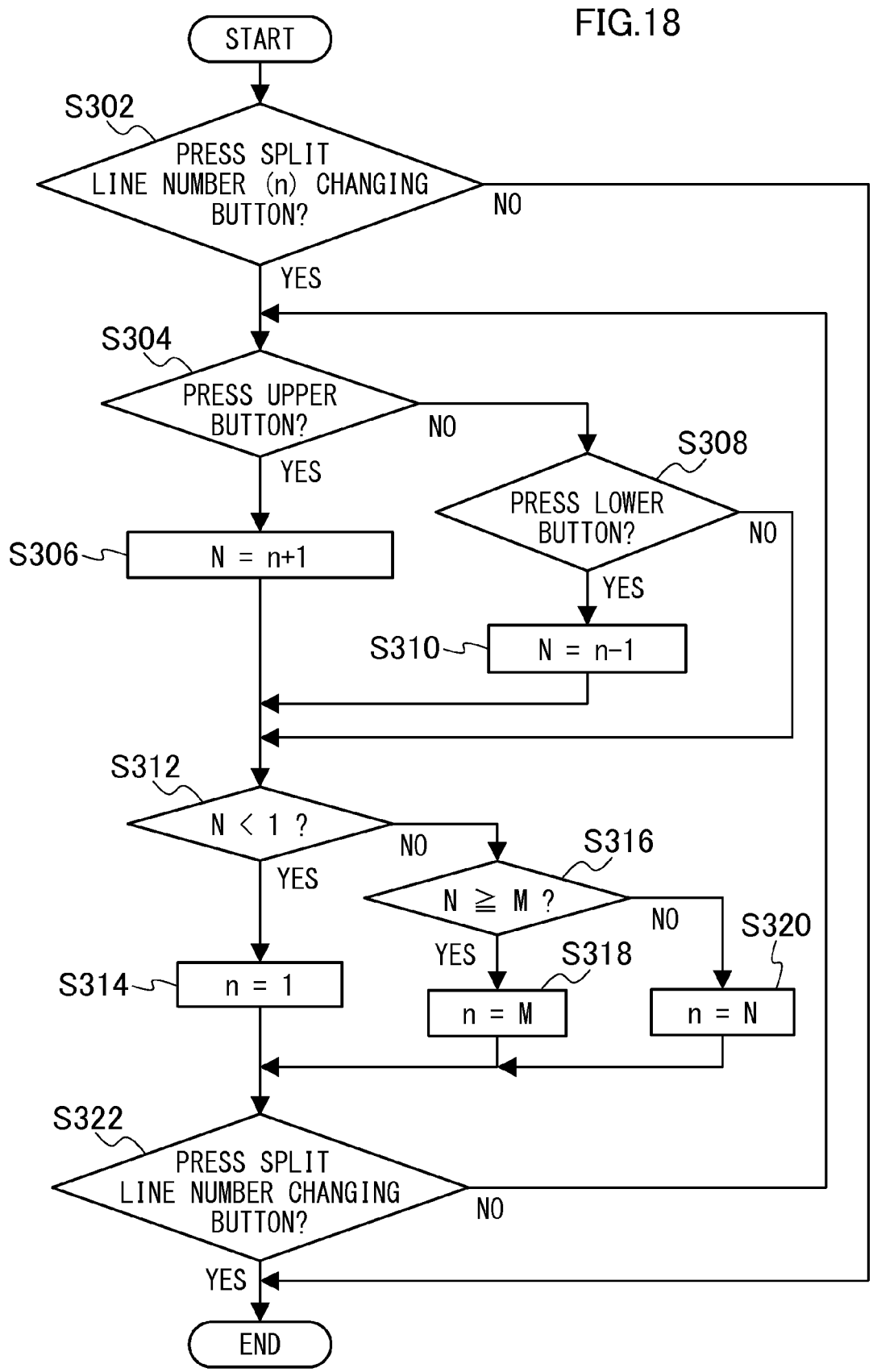
FIG. 18 is a flow chart showing a flow of an example of focus-confirmation image display processing in a third embodiment.

FIG. 18 is a flow chart showing a flow of an example of focus-confirmation image display processing in the third embodiment. The present processing is performed by control of the CPU 11 constituting the selection control section 106 in accordance with a program.

In the present example, the operation section 9 shown in FIG. 3 is provided with a split line number changing button, an upper button, and a lower button. In a case where the display 8 is a touch panel type display, the display 8 of a touch panel type may be used as number input device.

In a case where the split line number changing button is pressed (Yes at step S302), it is determined further whether the upper button is pressed or not (step S304), and whether the lower button is pressed or not (step S308).

In a case where the split line number changing button is pressed (Yes at step S302), and further the upper button is pressed (yes at step S304), it is set that N=n+1 (step S306). In addition, in a case where the split line number changing button is pressed (Yes at step S302), and further the lower button is pressed (yes at step S308), it is set that N=n−1 (step S310). In a case where N<1, it is set that n=1 (step S312, S314), and in a case where N≥M, it is set that n=M (an upper limit value) (step S316 and S318), and in a case where N<M, it is set that n=N (step S320).

Here, n is a variable showing "the present number of split lines/2", and N is a variable showing a temporary value of n, and M shows an upper limit value of n.

That is, in a case where the number of the split lines inputted by the split line number changing button is set at K, only input of K of 1, 3, 5, . . . 2n−1 (n is an integer in which n≤M) is accepted. In this manner, in the present example, only input of an odd number is accepted as the number K of the split lines.

Next, it is determined whether the split line number changing button is pressed again or not (step S322), and step S304 to S322 is repeated until the split line number changing button is pressed again. In a case where the split line number changing button is pressed again (yes at step S322), the present processing is ended.

(Operation Effect of Digital Camera of Third Embodiment)

The selection control section 106 of the present embodiment accepts only input of an odd number as the number K of the boundary lines, and positions the split line 63 (boundary line) in a place of (K+1)/2 of the number K of the split lines 63 at the center or near the center of the split image 61 (focus-confirmation image). Accordingly, a user can easily adjust focus while viewing the split image 61 in which the split line 63 is set at the center or near the center of the split image 61.

Fourth Embodiment

In the digital camera 2 of a fourth embodiment, the selection control section (designated by reference numeral 106 in FIG. 6) changes a position of the split line 63 (boundary line) in the split image 61 (focus-confirmation image) as time elapses.

(Example of Focus-Confirmation Image Display Processing of Fourth Embodiment)

Figure 19:
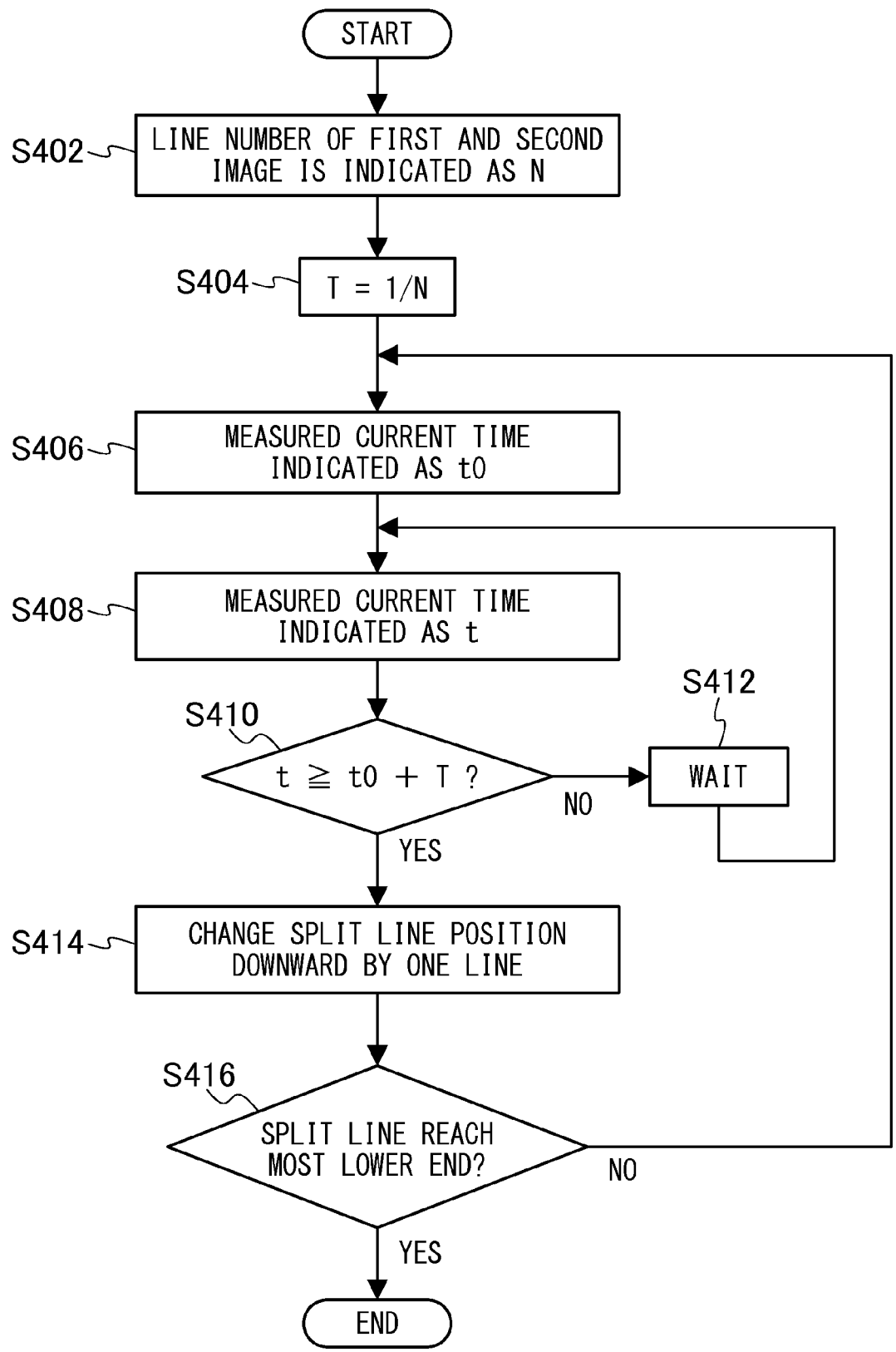
FIG. 19 is a flow chart showing a flow of an example of focus-confirmation image display processing in a fourth embodiment.

FIG. 19 is a flow chart showing a flow of an example of focus-confirmation image display processing in the fourth embodiment. The present processing is performed by control of the CPU 11 constituting the selection control section 106 in accordance with a program. First, the number of the split lines 63 (the number of lines) of the first image 58a and the second image 58b is set at "N" (step S402). Next, a time interval T of changing the split line 63 is calculated (step S404). In the present example, T=1/N is calculated on the basis of the number N of the lines.

Subsequently, a position of the split line 63 in the split image 61 is changed as time elapses (step S406 to S416). Specifically, first, current time is acquired and is indicated as initial time t0 (step S406). Next, current time is acquired (step S408), and the current time t and t0+T are compared (step S410). In a case where the current time t<t0+T (No at step S410), processing waits (step S412), and returns to step S406. In a case where the current time t≥t0+T (Yes at step S410), the split line 63 is moved downward in the split image 61 (step S414). If the split line 63 does not reach to the most lower end of the split image 61 (No at step S416), the processing returns to step S406 to continue movement of the split line 63. If the split line 63 reaches to the most lower end of the split image 61 (Yes at step S416), the present processing is ended.

In the present example, there is described a case where the split line 63 moves from the most upper end of the split image 61 to the most lower thereof in "one second" in order to facilitate understanding of the invention, however, movement time or movement speed may be changed.

In addition, the third embodiment and the fourth embodiment may be combined so that a plurality of split lines 63 move from the most upper end of the split image 61 to the most lower thereof. In this case, one of the plurality of split lines 63 may stop, and the other may move.

With reference to FIG. 12, a state of movement of the split line 63 as time elapses will be described. In the first embodiment, the split line 63 is moved when an instruction to change a position of the split line 63 is inputted from the outside. In contrast, in the present embodiment, as time elapses, the split line 63 moves from an upper portion (the portion (A) in FIG. 12) of the split image 61 to a lower portion of the split image 61 (the portion (C) in FIG. 12) via the center of the split image 61 in the vertical direction (the portion (B) in FIG. 12).

Figure 20:
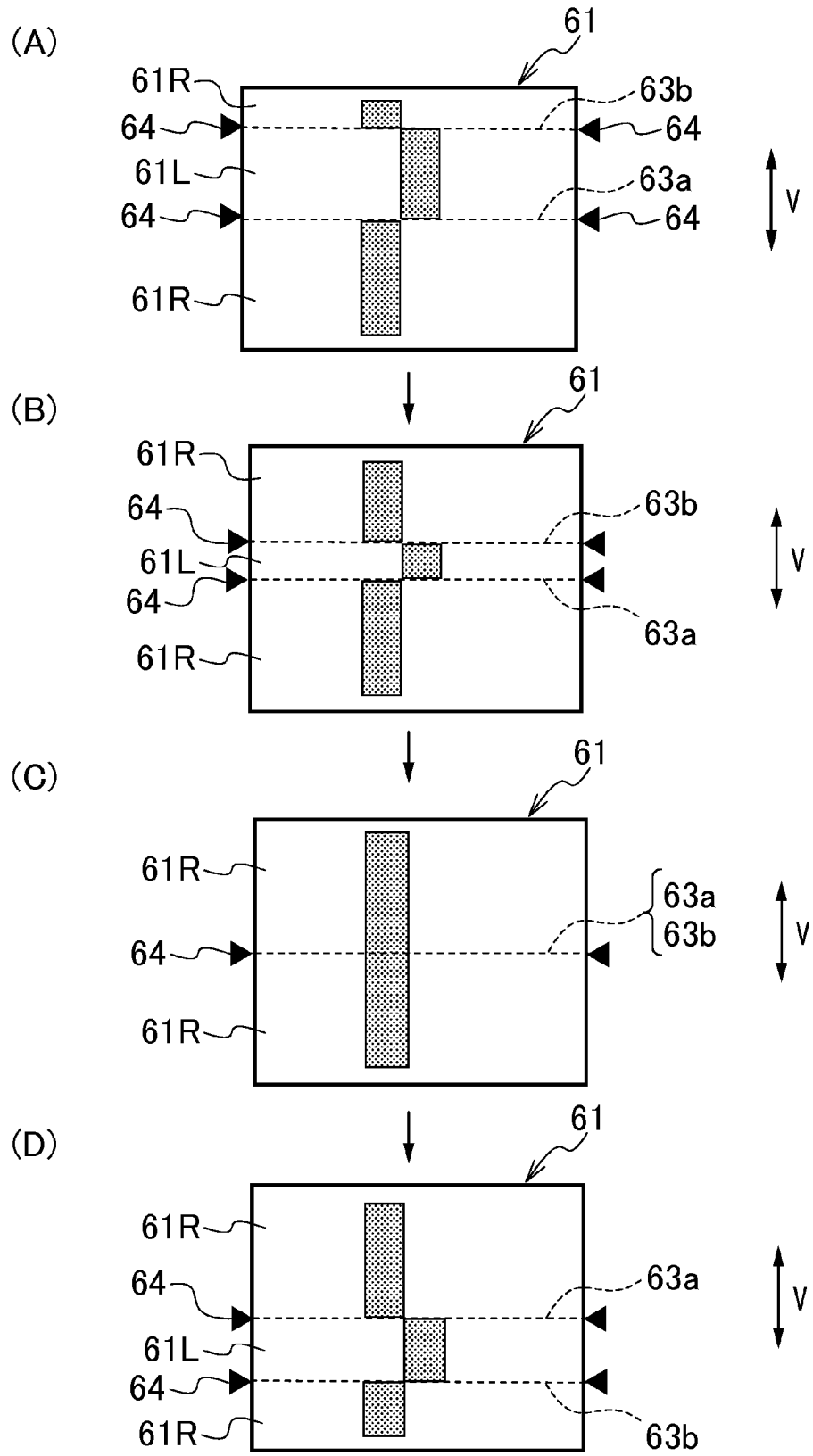
FIG. 20 is an illustration used for describing change of a position of a boundary line in an example of a focus-confirmation image in the fourth embodiment.

FIG. 20 shows an example of display of two split lines 63. As time elapses, the display of the two split lines 63 changes from a display state shown in the portion (A) in FIG. 20 to a display state shown in the portion (D) in FIG. 20 via display states shown in the portions (B) and (C) in FIG. 20.

In the present example, the split line 63a, one of two split lines 63a and 63b is positioned and fixed at a central portion (or near the central portion) of the split image 61 in the vertical direction, and the other, the split line 63b, moves from the most upper end of the split image 61 to the most lower thereof as time elapses.

(Operation Effect of Digital Camera of Fourth Embodiment)

In the present embodiment, the selection control section 106 changes a position of the split line 63 (boundary line) in a focus-confirmation image as time elapses. Accordingly, a user can accurately grasp a focus state while viewing the split image 61 in which the split line 63 moves without inputting an instruction to change a position of the split line 63 by manual operation.

(Digital Camera of Fifth Embodiment)

In a fifth embodiment, as with the fourth embodiment, the selection control section 106 changes a position of the split line 63 in the split image 61 (focus-confirmation image) as time elapses. In contrast, after movement of the split line 63 is started, the selection control section 106 of the fifth embodiment stops the movement of the split line 63 in the split image 61 when a focus position (position of the focus lens 16) is changed by means of a focus ring 3a (focusing operation device).

(Example of Focus-Confirmation Image Display Processing of Fifth Embodiment)

Figure 21:
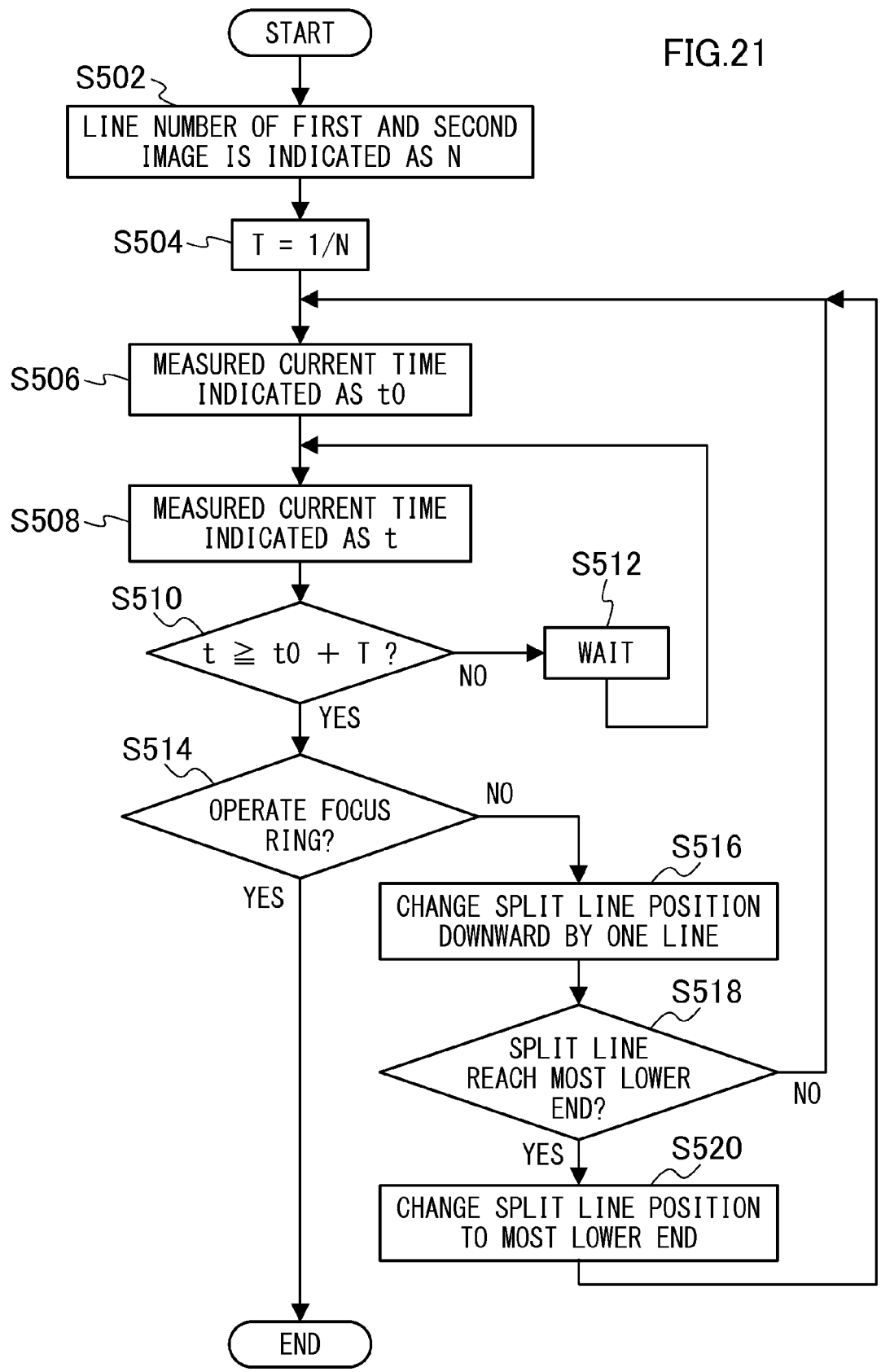
FIG. 21 is a flow chart showing a flow of an example of focus-confirmation image display processing in a fifth embodiment.

FIG. 21 is a flow chart showing a flow of an example of focus-confirmation image display processing in the fifth embodiment. The present processing is performed by control of the CPU 11 constituting the selection control section 106 in accordance with a program.

Since step S502 to S512 of the present example is identical with step S402 to S412 of the fourth embodiment shown in FIG. 19, description of step S502 to S512 will be omitted.

In the present example, if a predetermined time T elapses (Yes at step S510), it is determined whether the focus ring 3a is operated or not (step S514). If it is determined that the focus ring 3a is not operated (focusing operation) (No at step S514), a position of the split line 63 is changed downward by one line in the split image 61 (step S516). Then, it is determined whether the split line 63 reaches to the most lower end of the split image 61 (step S518), and if the split line 63 does not reach to the most lower end (No at step S518), step S506 to S518 is repeated unless there is focusing operation to continue movement of the split line 63. If the split line 63 reaches to the most lower end of the split image 61 (Yes at step S518), a position of the split line 63 is changed to the most upper end of the split image 61 (step S520), and step S506 to S518 is repeated unless there is focusing operation, and then processing returns to step S506 to continue the movement of the split line 63.

If it is determined that the focus ring 3a is operated (Yes at step S514), the present processing is ended to stop movement of the split line 63. That is, when operation for a focus position is started by means of the focus ring 3a, movement of the split line 63 in the split image 61 is stopped.

If the focus ring 3a is not operated for a predetermined time, the movement of the split line 63 may be started again.

(Operation Effect of Digital Camera of Fifth Embodiment)

In the fifth embodiment, the selection control section 106 stops movement of the split line 63 in the split image 61 when operation of changing a focus position is started by means of the focus ring 3a (focusing operation device). That is, when a user starts operation of adjusting focus (operation of changing a focus position), it is deemed that the user wants to adjust focus at a current position of the split line 63. Thus, the present embodiment is configured to stop movement of the split line 63. Accordingly, while the split line 63 moves as time elapses, the user can start operation of adjusting focus by only operating the focus ring 3a without a separate instruction to stop movement of the split line 63.

(Digital Camera of Sixth Embodiment)

Figure 22:
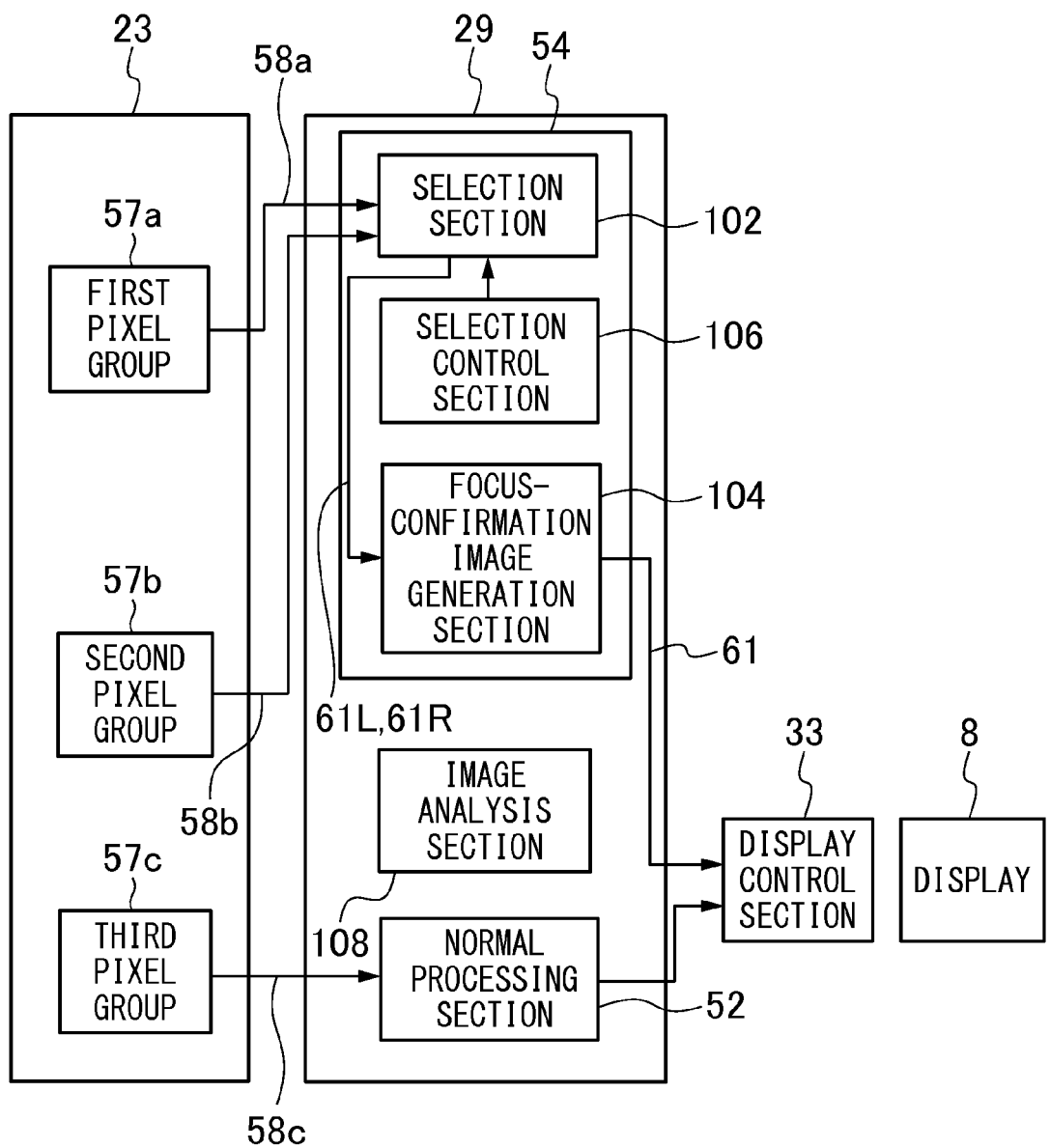
FIG. 22 is a block diagram of image processing of a digital camera of a sixth embodiment.

FIG. 22 is a block diagram showing the image processing circuit 29 of a sixth embodiment. In FIG. 22, each of components identical with the components described in FIG. 6 (a block diagram of the first to fifth embodiments) is designated by the same reference numeral used in FIG. 6, and description thereof is omitted.

As shown in FIG. 22, the image processing circuit 29 of the present embodiment includes an image analysis section 108 that analyzes images 58a, 58b, and 58c acquired from the imaging element 23.

In addition, the selection control section 106 of the present embodiment sets a position of the split line 63 (boundary line) in the split image 61 (focus-confirmation image) on the basis of an analysis result acquired by the image analysis section 108.

(Example of Focus-Confirmation Image Display Processing of Sixth Embodiment)

Figure 23:
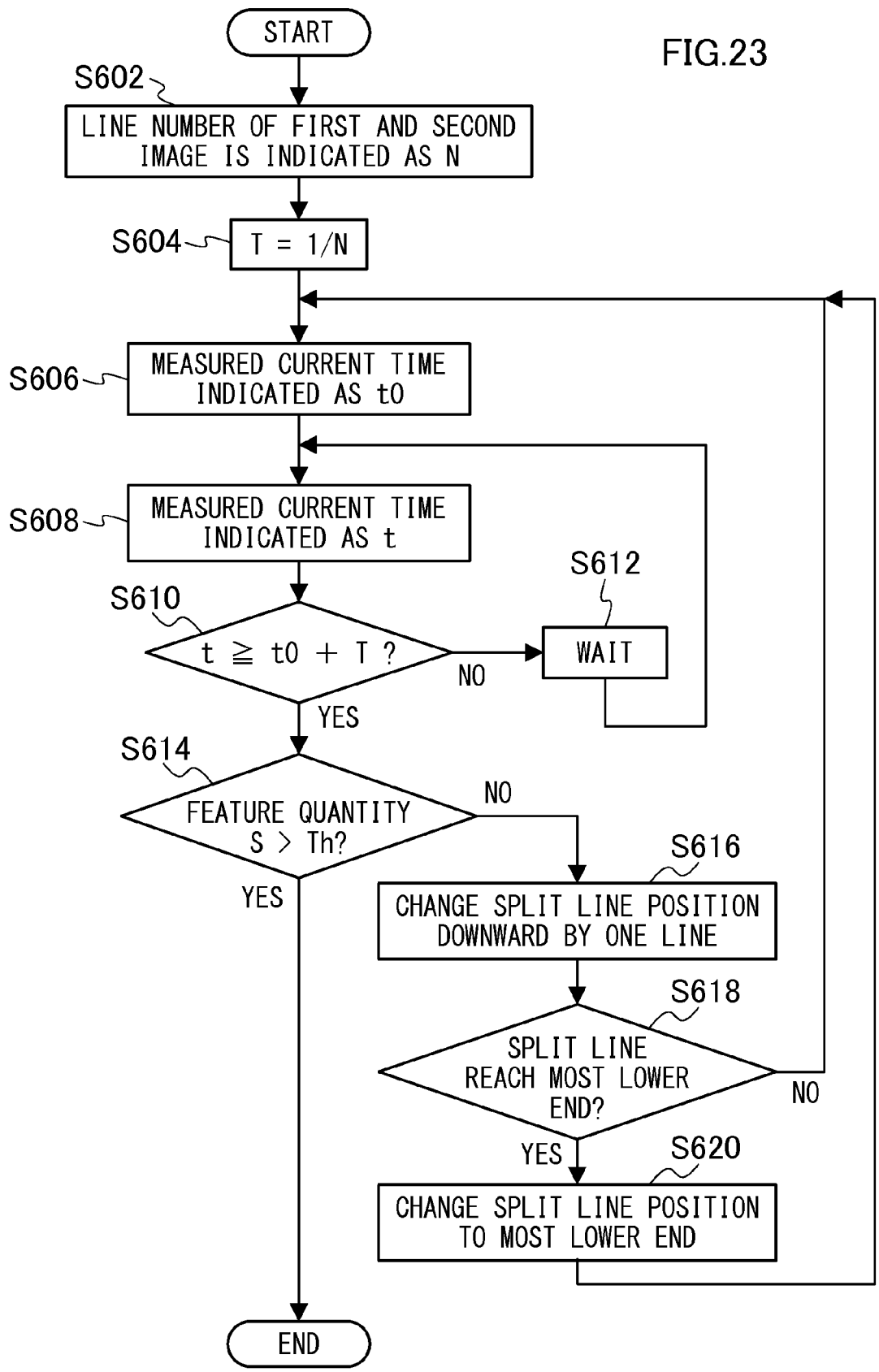
FIG. 23 is a flow chart showing a flow of an example of focus-confirmation image display processing in the sixth embodiment.

FIG. 23 is a flow chart showing a flow of an example of focus-confirmation image display processing in the sixth embodiment. The present processing is performed by control of the CPU 11 constituting the selection control section 106 in accordance with a program.

Since step S602 to S612 of the present example is identical with step S402 to S412 of the fourth embodiment shown in FIG. 19, description of step S602 to S612 will be omitted.

In the present example, if a predetermined time T elapses (Yes at step S610), a feature quantity S (feature quantity of an image) that is an analysis result of the images 58a, 58b, and 58c acquired from the imaging element 23 is compared with a threshold value Th (step S614). In a case where the feature quantity S≤Th (No at step S614), a position of the split line 63 is changed downward by one line in the split image 61 (step S616). Then, it is determined whether the split line 63 reaches to the most lower end of the split image 61 (step S618), and if the split line 63 does not reach to the most lower end (No at step S618), processing returns to step S606 to continue movement of the split line 63. If the split line 63 reaches to the most lower end of the split image 61 (Yes at step S618), a position of the split line 63 is changed to the most upper end of the split image 61 (step S620), the processing returns to step S606 to continue the movement of the split line 63.

On the other hand, in a case where the feature quantity S>Th, (Yes at step S614), the present processing is ended to stop the movement of the split line 63. That is, if the feature quantity S of an image is large, the movement of the split line 63 is stopped at a position with a large feature quantity in the split image 61.

The feature quantity S of an image includes first to fourth feature quantities as follows as a specific example:

A first feature quantity that is a phase difference between first and second pixels of pair pixels;

A second feature quantity that is the amount of detection of contrast;

A third feature quantity that is a horizontal edge (an edge in a direction of a boundary line); and A fourth feature quantity that is a detection result of a specific object (such as an amount showing a feature of the specific object, and a position of the specific object).

(Example of Position Setting of Split Line by Using First Feature Quantity)

In a case where the first feature quantity (a phase difference between first and second pixels) is used, the selection control section 106 calculates a position of the split line 63 in the split image 61 as follows, for example.

First, a phase difference between pixel values of the first pixel 36a and the second pixel 36b, constituting the pair pixels PR0 of the imaging element 23, is calculated for each of the pair pixels PR0 on the basis of the first image 58a and the second image 58b. That is, a phase difference between the pixel 59a of the first image 58a and the pixel 59b of the second image 58b, constituting the pair pixels PR1, is calculated. Next, a position with the largest phase difference in the split image 61 is detected, and then the split line 63 is set at the position with the largest phase difference in the split image 61.

That is, the selection control section 106 of the present example sets the split line 63 at the most out-of-focus position in the split image 61.

(Example of Position Setting of Split Line by Using Second Feature Quantity)

In a case where the second feature quantity (the amount of detection of contrast) is used, the selection control section 106 calculates a position of the split line 63 in the split image 61 as follows, for example.

First, the image analysis section 108 calculates distribution of contrast in the split image 61 on the basis of at least one of the first image 58a, the second image 58b, and the normal image 58c. Next, the image analysis section 108 detects a position with the largest contrast in the split image 61, and then the focus-confirmation image generation section 104 sets the split line 63 at the position with the largest contrast in the split image 61.

That is, the selection control section 106 of the present example sets the split line 63 at the easiest position to be focused in the split image 61. (Example of Position Setting of Split Line by Using Third Feature Quantity)

In a case where the third feature quantity (the amount of horizontal edge) is used, the focus-confirmation image generation section 104 calculates a position of the split line 63 in the split image 61 as follows, for example.

First, the image analysis section 108 calculates distribution of the amount of an edge (horizontal edge) in a horizontal direction (a direction along the split line 63) on the basis of at least one of the first image 58a, the second image 58b, and the normal image 58c. If there is a clear line along a vertical direction (a direction orthogonal to the split line 63) in the split image 61, the horizontal edge is positioned at the clear line. Next, the selection control section 106 sets a position of the split line 63 at a position with the largest amount of the horizontal edge in the split image 61.

That is, the selection control section 106 of the present example sets the split line 63 at the easiest position to be focused in the split image 61.

(Example of Position Setting of Split Line by Using Fourth Feature Quantity)

In a case where the amount of face detection is used as the fourth feature quantity (a detection result of a specific object), the selection control section 106 calculates a position of the split line 63 in the split image 61 as follows, for example.

Figure 24:
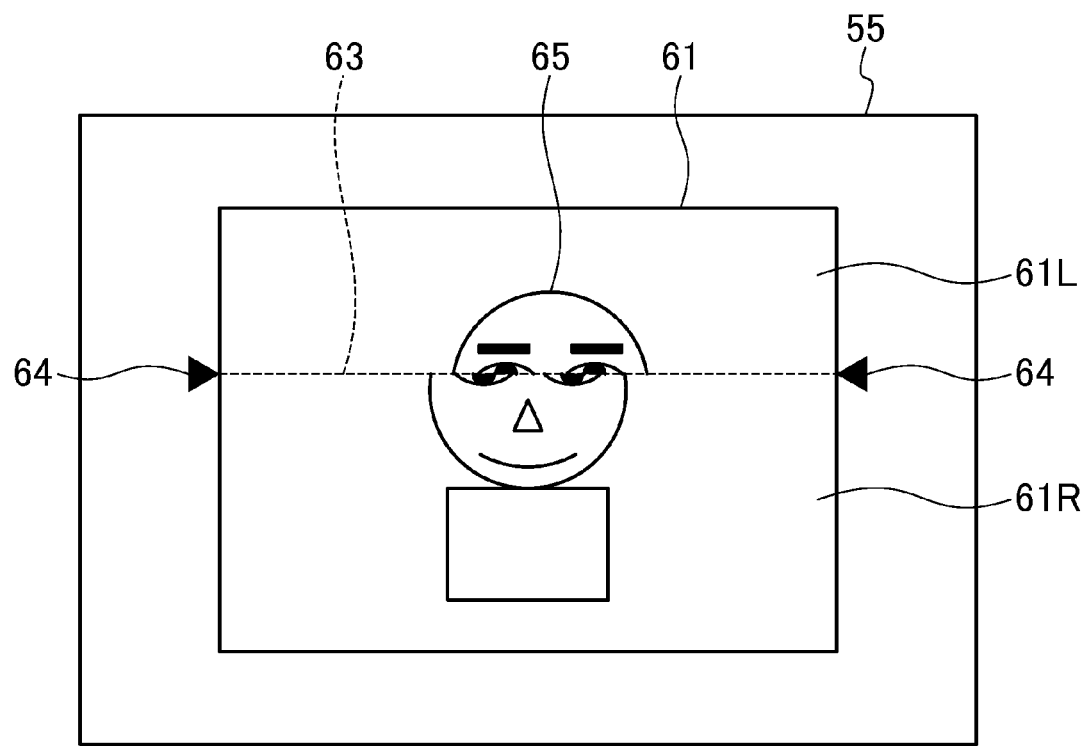
FIG. 24 is an illustration showing a focus-confirmation image in a non-focusing state in the sixth embodiment.
Figure 25:
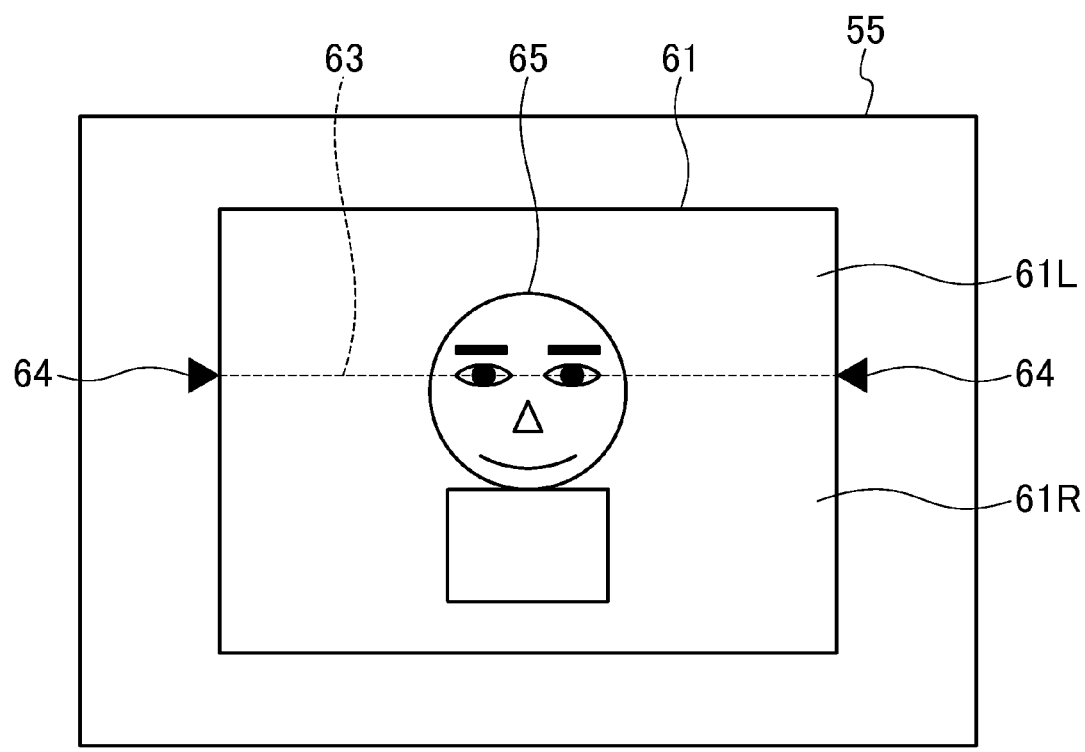
FIG. 25 is an illustration showing a focus-confirmation image in a focusing state in the sixth embodiment.

First, the image analysis section 108 detects a face image in the normal image 58c to determine whether there is a face image in the split image 61 or not. That is, a position with the highest amount of face detection showing a feature of a face is detected in the normal image 58c. In the present example, detection of a face component (such as an eye and a mouth) as well as detection of a face image is performed at a time. Next, as shown in FIGS. 24 and 25, the selection control section 106 sets the split line 63 at a position in a face image 65. In the split image 61 in FIG. 24, a face of a subject corresponding to the face image 65 is out of focus, so that the first split image 61L and the second split image 61R are displayed in a state where the images are laterally deviated from each other. In contrast, in the split image 61 in FIG. 25, a face of a subject corresponding to the face image 65 is in focus, so that the first split image 61L and the second split image 61R are displayed in a state where the images laterally coincide with each other.

The selection control section 106 of the present example sets the split line 63 at a position of eyes in the face image 65. In addition, the display control section 33 of the present example allows the split line mark 64 showing the position of the split line 63 to be indicated near the split line 63.

(Digital Camera of Seventh Embodiment)

Figure 26:
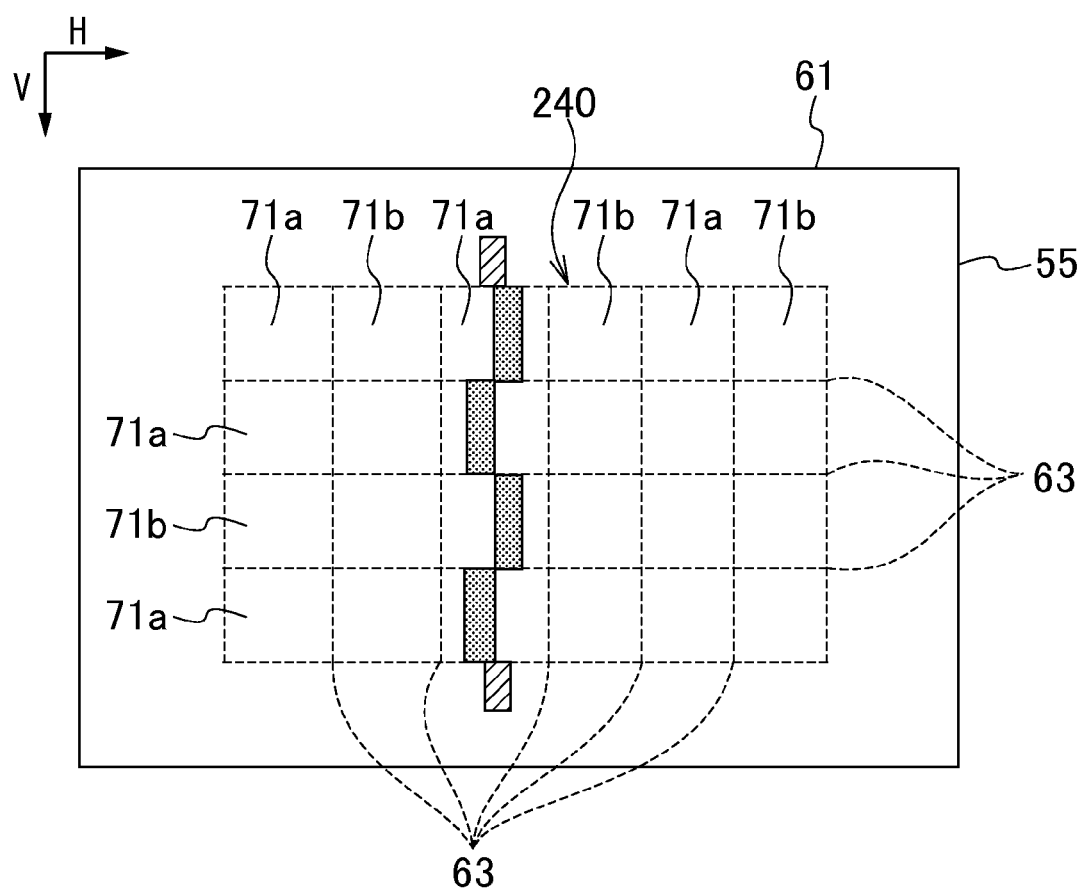
FIG. 26 is an illustration showing a focus-confirmation image in a focusing state in a seventh embodiment.

In a seventh embodiment, as shown in FIG. 26, the focus-confirmation image generation section 104 alternately arranges first images 71a (divided images of the first image 58a) and second images 71b (divided images of the second image 58b) in a lateral direction H (first direction) in the split image 61 (focus-confirmation image), as well as alternately arranges the first images 71a and the second images 71b in a vertical direction V (second direction) orthogonal to the lateral direction H in the split image 61, thereby arranging the first images 71a and second images 71b in the split image 61 in a lattice pattern.

(Example of Focus-Confirmation Image Display Processing of Seventh Embodiment)

Hereinafter, as shown in FIG. 26, the split image 61 in which the first images 71a and the second images 71b are arranged in a lattice pattern (or the split lines 63 are arranged in a lattice pattern) is referred to as a "lattice pattern focus-confirmation image".

Figure 27:
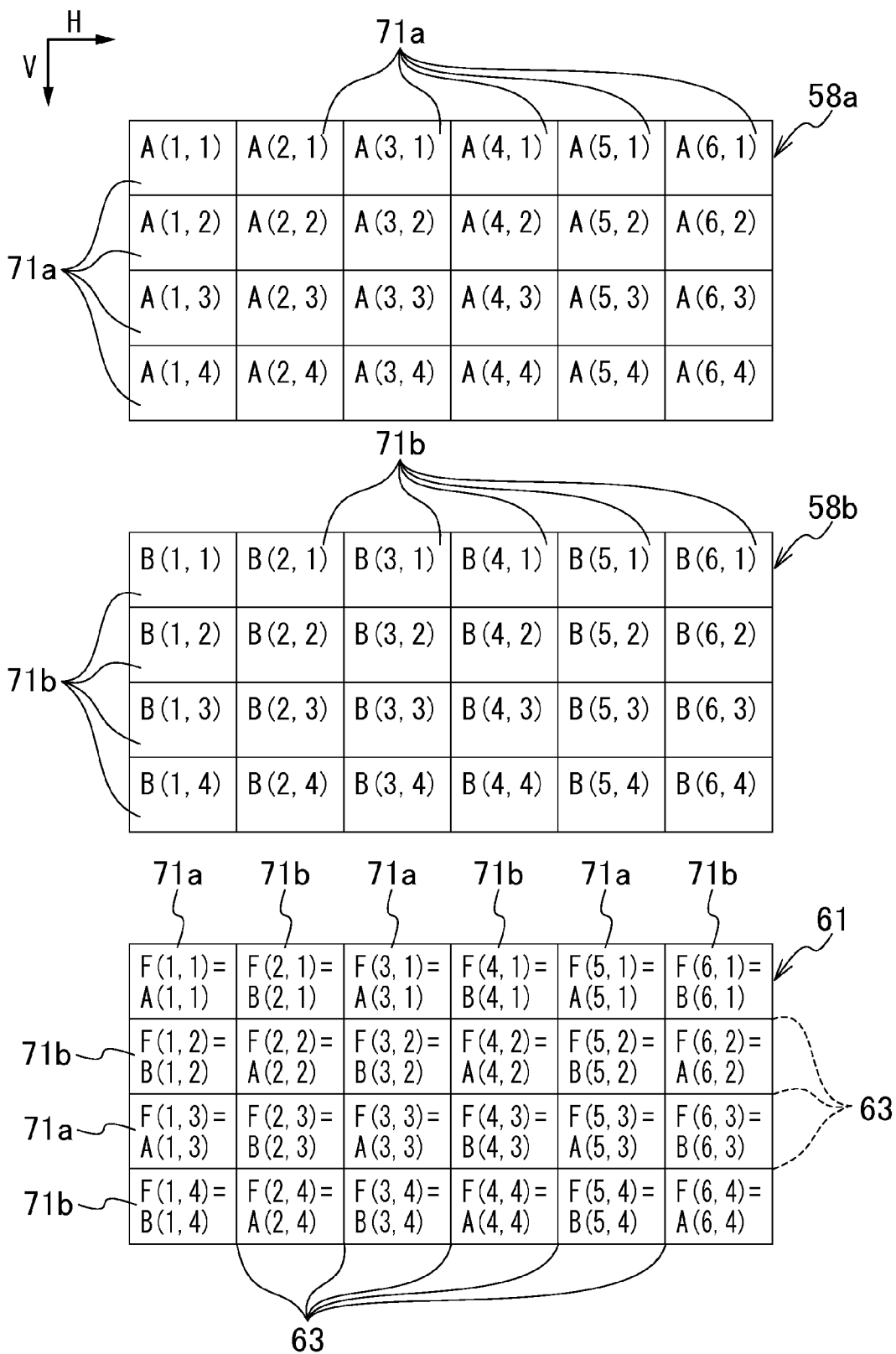
FIG. 27 is an illustration used for describing focus-confirmation image generation in the seventh embodiment.

The focus-confirmation image generation section 104 of the present example generates the lattice pattern focus-confirmation image (split image 61) as specifically shown in FIG. 27.

First, each the first image 58a based on the first pixel group 57a and the second image 58b based on the second pixel group 57b is divided into divisions in a lattice pattern. That is, each of the first image 58a and the second image 58b is divided into partial images (the first images 71a and the second images 71b) each of which includes S×T pixels (S and T is an integer). FIG. 27 shows the first image 58a and the second image 58b each of which is divided into 6×4 divisions.

Next, the first image 71a and the second image 71b are alternately selected from a left edge (one edge) to a right edge (the other edge) in the lateral direction H (horizontal direction), as well as are alternately selected from an upper edge (one edge) to a lower edge (the other edge) in the vertical direction V (vertical direction). As a result, the lattice pattern focus-confirmation image (split image 61) in which the split lines 63 are arranged in a lattice pattern is generated.

That is, in a case where the first images 71a, the second images 71b, and partial images of the split image 61, are indicated as A(i,j), B(i,j), and F(i,j), respectively, and where i is an integer of from 1 to S, and j is an integer of from 1 to T, relationships among images are as follows: F(i,j)=A(i,j) in a region where i is an odd number as well as j is an odd number; F(i,j)=B(i,j) in a region where i is an odd number as well as j is an even number; F(i,j)=B(i,j) in a region where i is an even number as well as j is an odd number; and F(i,j)=A(i,j) in a region where i is an even number as well as j is an even number.

(Digital Camera of Eighth Embodiment)

Figure 28:
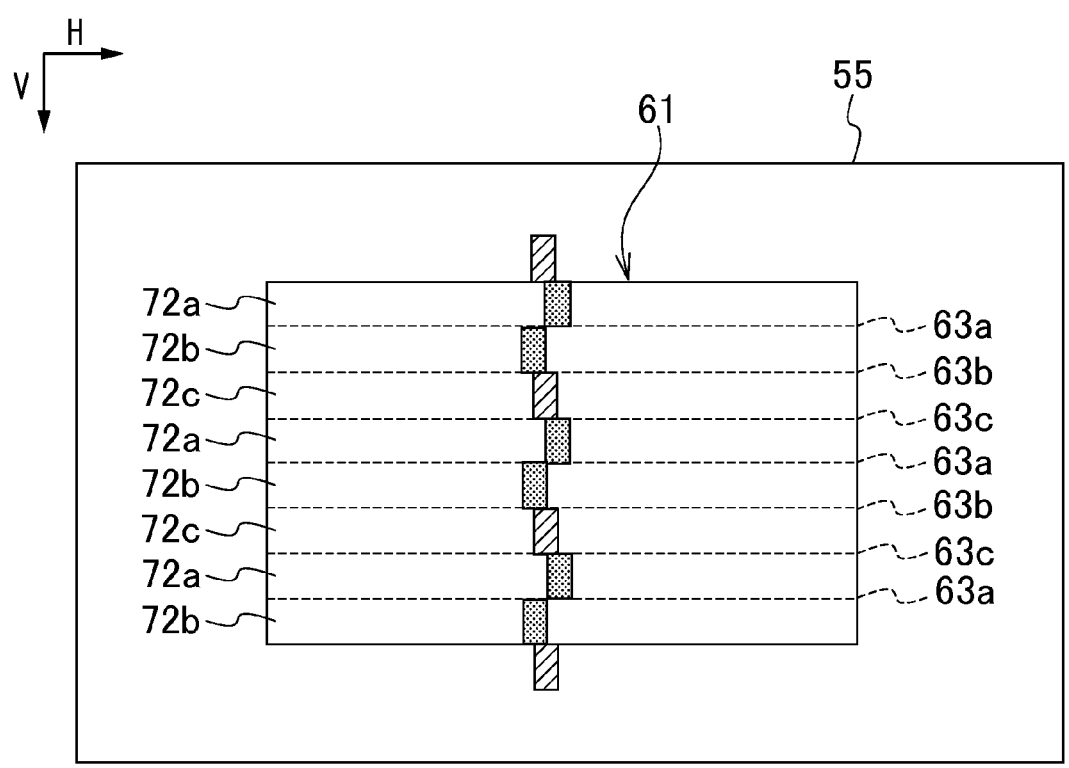
FIG. 28 is an illustration showing a focus-confirmation image in a focusing state in an eighth embodiment.

In the eighth embodiment, as shown in FIG. 28, the focus-confirmation image generation section 104 arranges the first images 72a based on the first pixel group 57a and the second images 72b based on the second pixel group 57b in the split image 61 so that the first image and the second image are adjacent to each other, as well as arranges the partial images 72c of the normal image 58c based on the third pixel group 57c in the split image 61 so that the partial image 73c is adjacent to the first image 72a and the second image 72b, thereby forming the split image 61.

(Example of Focus-Confirmation Image Display Processing of Eighth Embodiment)

Hereinafter, the split image 61 in which the partial images (the first images 72a and the second images 72b) of the phase difference images (the first image 58a and the second image 58b) and the partial images 72c of the normal image (the normal image 58c) without phase difference are adjacent to each other as shown in FIG. 28 is referred to as a "focus-confirmation image mixed with a normal image".

Figure 29:
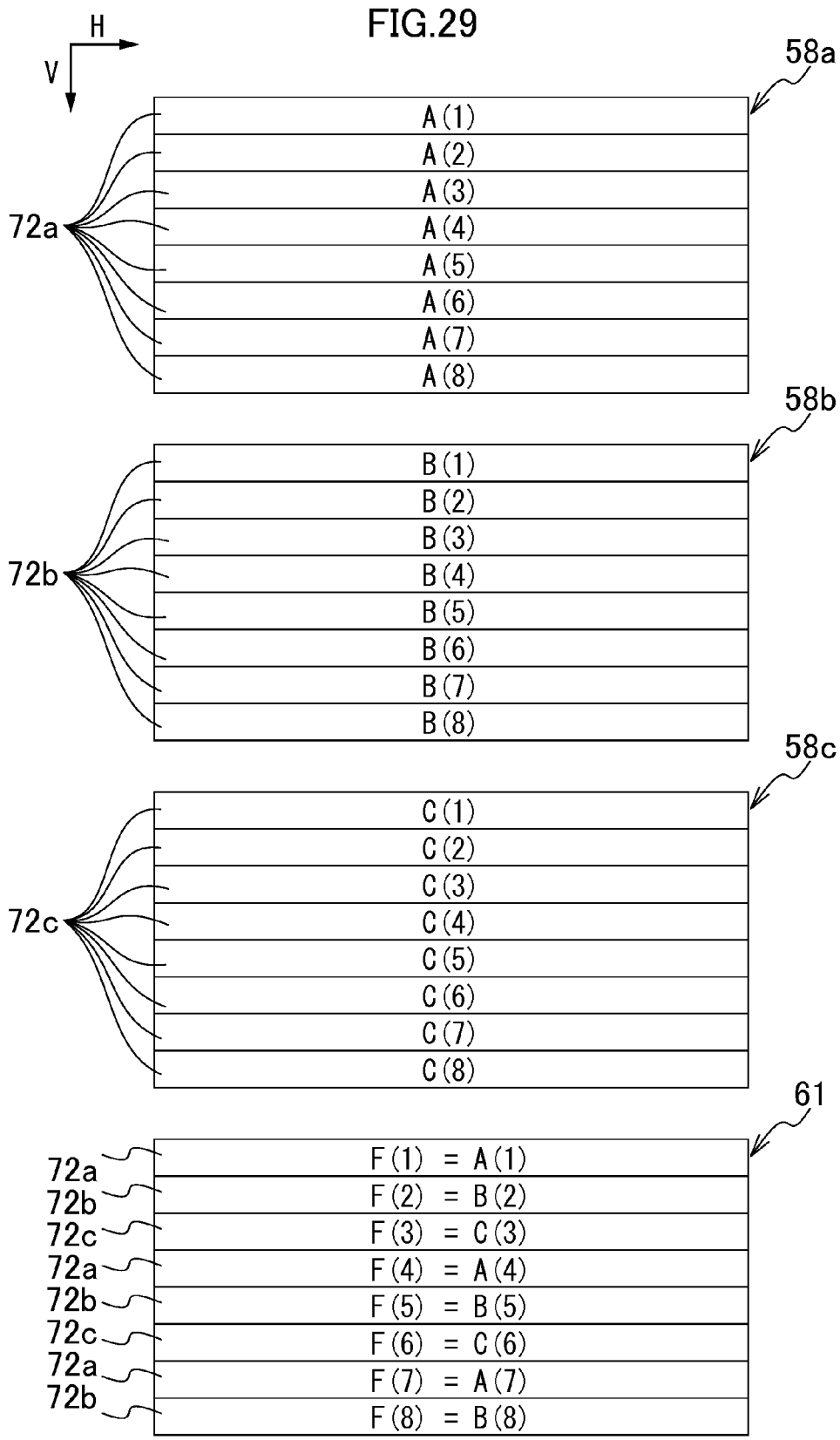
FIG. 29 is an illustration used for describing focus-confirmation image generation in the eighth embodiment.

The focus-confirmation image generation section 104 of the present example generates the focus-confirmation image mixed with a normal image (split image 61) as specifically shown in FIG. 29.

First, each the first image 58a based on the first pixel group 57a and the second image 58b based on the second pixel group 57b is divided into a plurality of strip-like divisions in the vertical direction V (vertical direction). That is, each of the first image 58a and the second image 58b is divided into the number Q (Q is an integer) of belt-like partial images 71a and 71b. FIG. 29 shows a case of eight partial images divided.

Second, a portion corresponding to the split image 61 is extracted from the normal image 58c based on the third pixel group 37c to become a size of the split image 61, and then the portion is divided into a plurality of belt-like partial images 72c in the vertical direction V (vertical direction) as with the first image 58a and the second image 58b. FIG. 29 shows a case of eight partial images divided.

Third, images are selected in the order of the first image 72a, the second image 72b, and the partial image 72c of the normal image 58c, from an upper edge (one edge) to a lower edge (the other edge) in the vertical direction V (vertical direction). As a result, there is generated the focus-confirmation image mixed with a normal image (split image 61) in which there is arranged the split line 63a between phase difference images (a boundary line between the first image 72a and the second image 72b), and split lines 63b and 63c each of which positioned between the phase difference image and the normal image (the split line 63b between the second image 72b and the partial image 72c of the normal image 58c, and the split line 63c between the partial image 72c of the normal image 58c and the first image 72a).

That is, in a case where a partial image (first image 72a) of the first image 58a, a partial image (second image 72b) of the second image 58b, a partial image 72c of the normal image 58c, and a partial image of the split image 61 are indicated as A(j), B(j), C(j), and F(j), respectively, and where j is an integer of from 1 to Q, and Q is an integer of 1 or more, the partial images are arranged in the order of F(j)=A(j), F (j+2)=B (j+2), and F (j+3)=C (j+3) to generate the focus-confirmation image mixed with a normal image (split image 61).

(Operation Effect of Digital Camera of Eighth Embodiment)

According to the digital camera of the present embodiment, phase difference occurs in a boundary line (split line) between a phase difference image of monochrome and a normal image of color, so that a user can adjust focus by using not only phase difference between images of monochrome but also phase difference between the phase difference between the images of monochrome and the normal image of color.

(Variation of Pixel Array of Imaging Element)
(Basic Array Pattern of Non-Bayer Array)

Although the imaging element 23 of each of the embodiments above includes a pixel array (color filter array) composed of a basic array pattern P corresponding to 6×6 pixels that are repeatedly arranged in horizontal and vertical directions, the pixel array may be composed of a basic array pattern corresponding to N×N pixels (N is three or more).

In addition, a color of a filter is not limited to three primary colors of R, G, and B. For example, a color filter array of color filters of four colors of the three primary colors of R, G, and B, with another color (such as emerald (E)) may be used, and also a color filter array color filters of C (cyan), M (magenta), and Y (yellow) that are complementary colors of the three primary colors of R, G, and B, may be used.

(Bayer Array)

Figure 30:
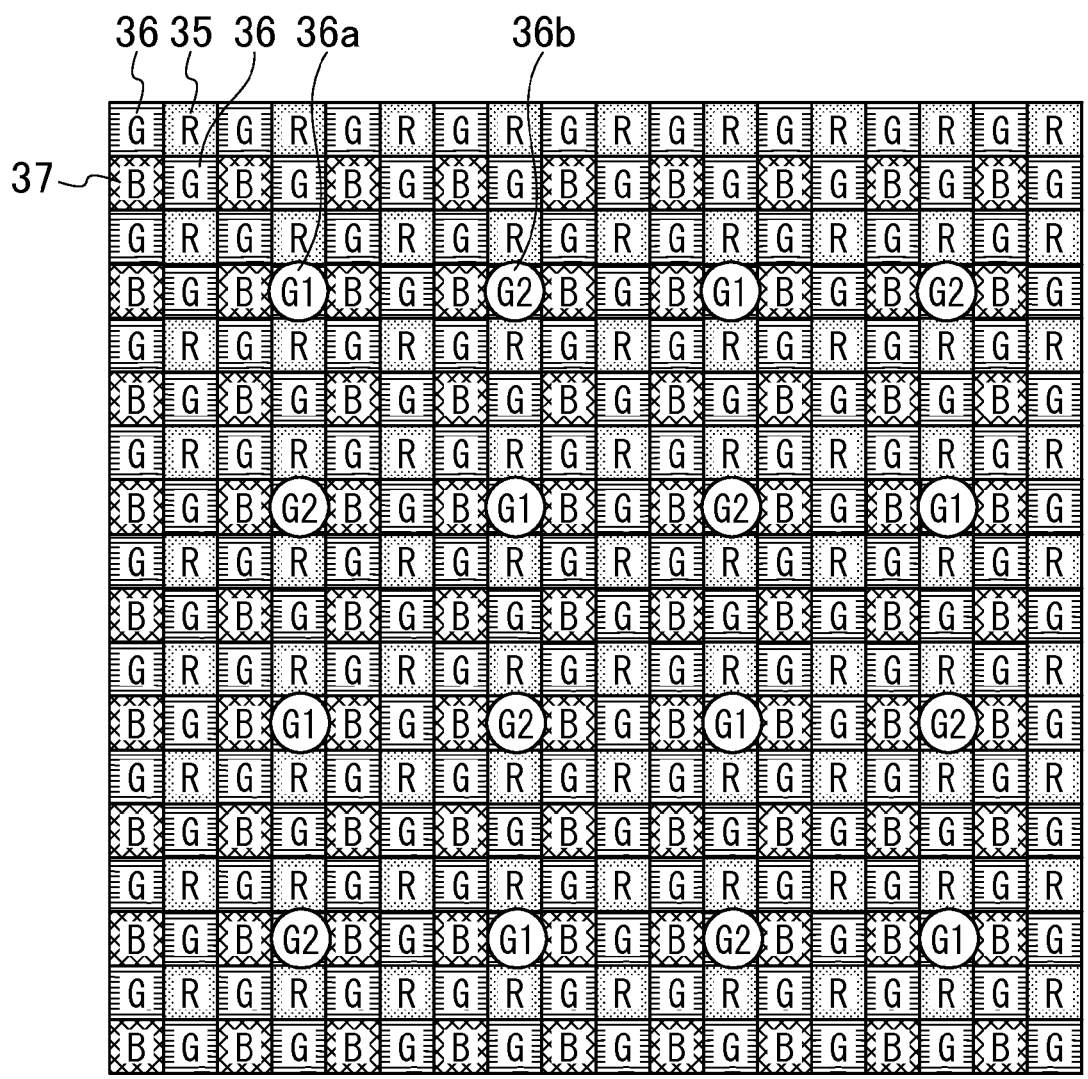
FIG. 30 is a front view of an imaging surface of an imaging element using the Bayer array.

In addition, a pixel array of the Bayer array shown in FIG. 30 may be used for the pixel array (color filter array) of the imaging element 23. In FIG. 30, the plurality of first phase difference pixels 36a (first pixels) and the plurality of second phase difference pixels 36b (second pixels) are arranged in a part of the pixel array composed of the Bayer array.

(Two-Face Array)

Figure 31:
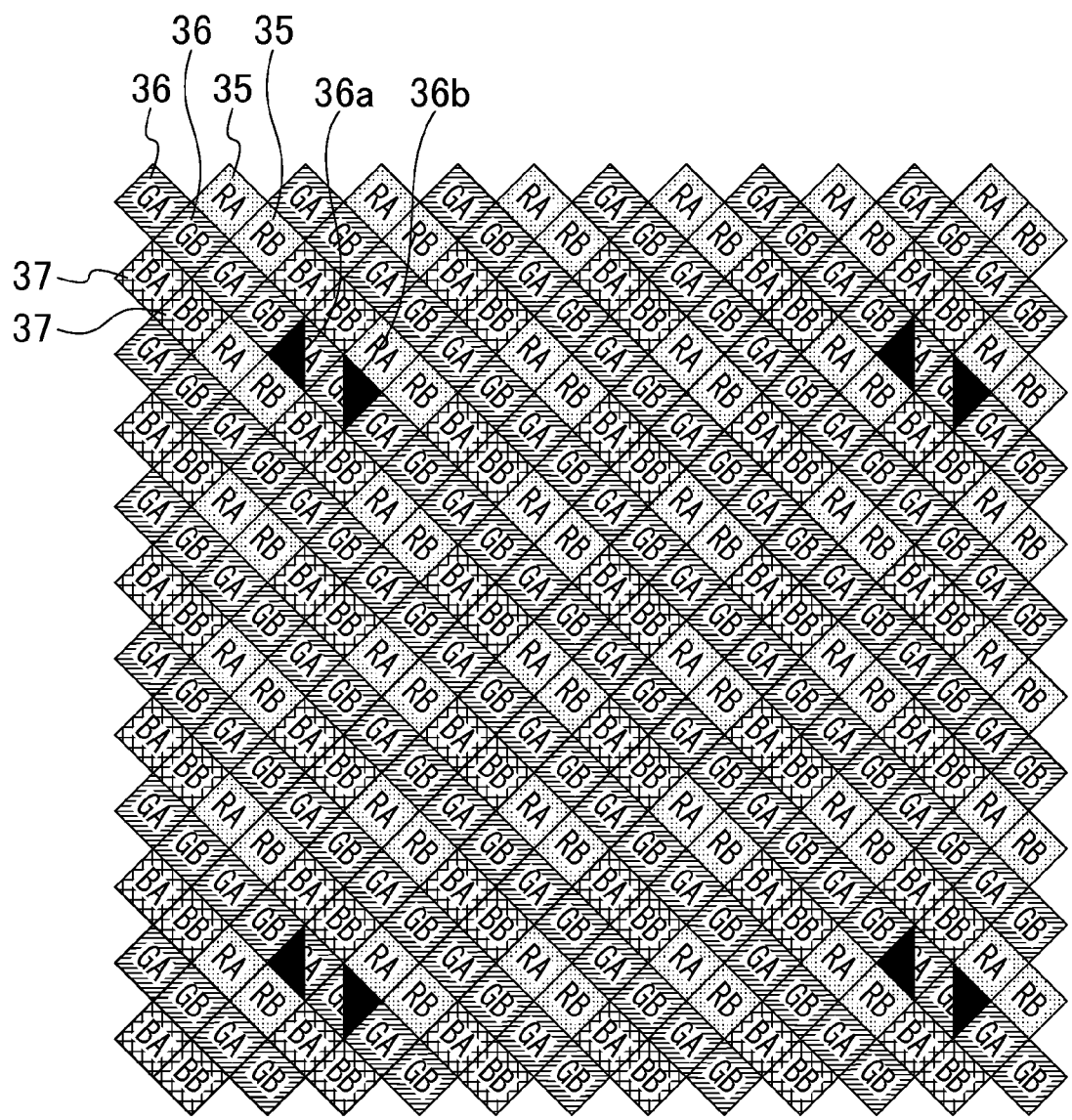
FIG. 31 is a front view of an imaging surface of an imaging element using a two-face array in which pixels of the same color are displaced.

Further, a pixel array composed of a two-face array in which pixels of the same color are displaced shown in FIG. 31 may be used for the pixel array (color filter array) of the imaging element 23. In FIG. 31, the plurality of first phase difference pixels 36a (first pixels) and the plurality of second phase difference pixels 36b (second pixels) are arranged in a part of the pixel array composed of a two-face array in which pixels of the same color are displaced, as well as the pair pixels of the first phase difference pixel 36a and the second phase difference pixel 36b are arranged therein so as to be adjacent to each other.

(Another Apparatus)

In each of the embodiments described above, although a digital camera is described as an example of the imaging device of the present invention, the present invention is also applicable to a cellular phone with a camera function, a smartphone, a PDA (personal digital assistant), and a portable type game machine, for example. Hereinafter, a smartphone will be described in detail as an example with reference to drawings.

Figure 32:
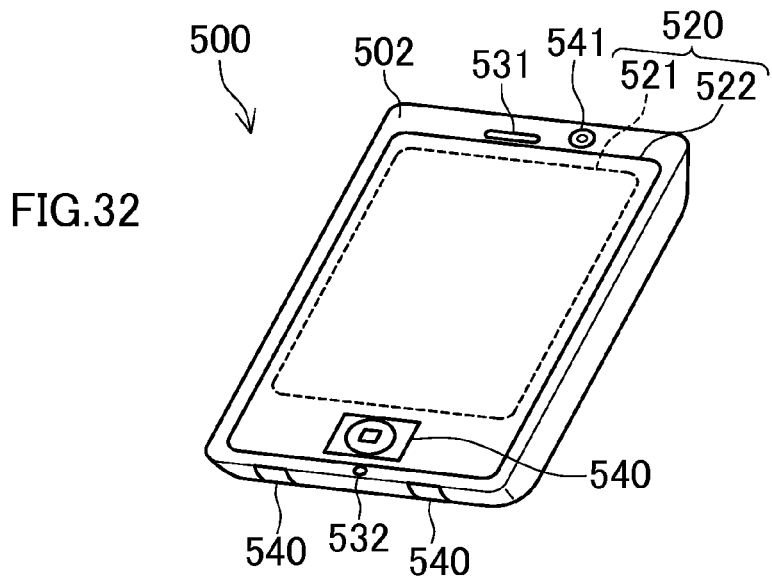
FIG. 32 is a perspective view of a smartphone.

FIG. 32 shows an appearance of a smartphone 500. The smartphone 500 shown in FIG. 32 has a tabular body 502 that is provided in its one face with a display-input unit 520 (also called "touch panel type display") into which a display panel 521 and an operation panel 522 (touch panel) serving as an input section are integrated. In addition, the body 502 includes a speaker 531, a microphone 532, an operation unit 540, and a camera unit 541. A configuration of the body 502 is not limited to the above, so that it is also possible to apply a configuration in which a display and an input section are separated, a foldable structure, or a configuration having a slide mechanism, for example.

Figure 33:
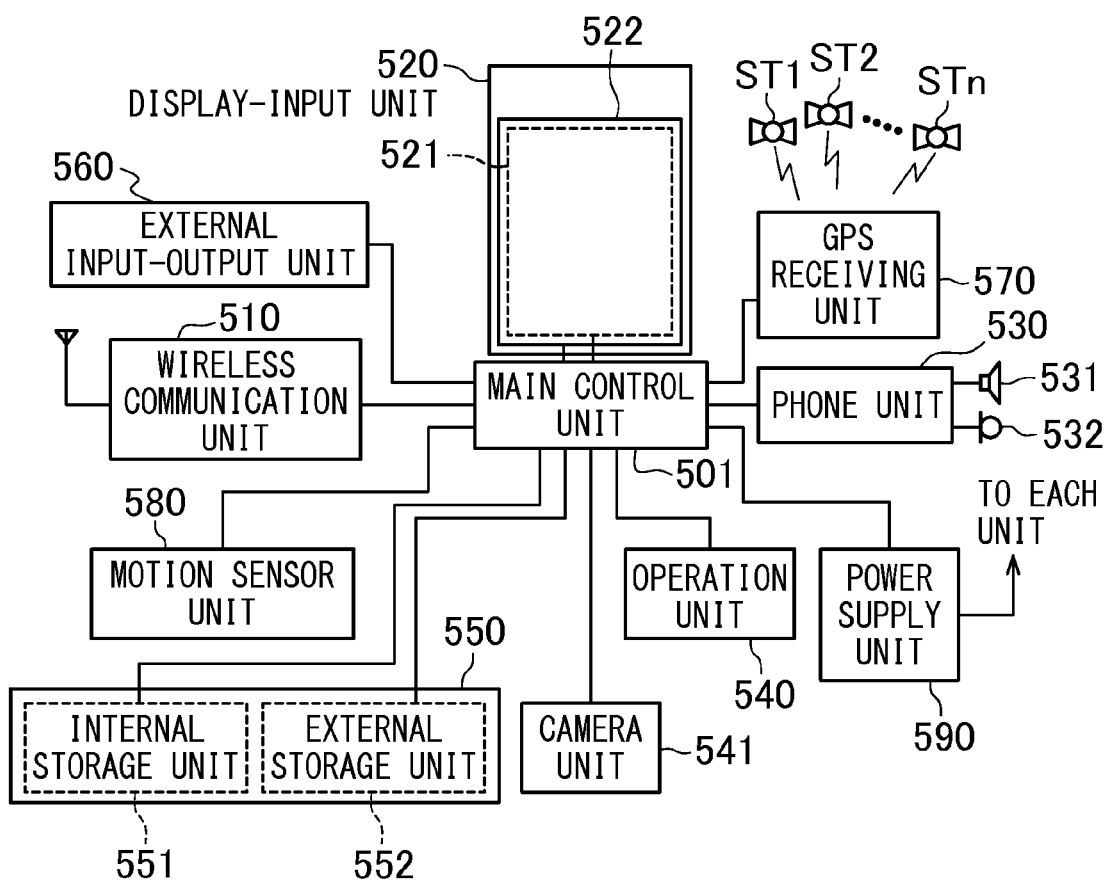
FIG. 33 is a block diagram of the smartphone.

FIG. 33 is a block diagram showing a configuration of the smartphone 500 shown in FIG. 32. As shown in FIG. 33, the smartphone includes the following as main components: a wireless communication unit 510; a display-input unit 520; a phone unit 530; an operation unit 540; an camera unit 541; a storage unit 550; an external input-output unit 560; a GPS (global positioning system) receiving unit 570; a motion sensor unit 580; a power supply unit 590; and a main control unit 501. In addition, the smartphone 500 has a wireless communication function of performing mobile wireless communication through a base station device BS and a mobile communication network NW, as a main function.

The wireless communication unit 510 performs wireless communication with respect to the base station device BS installed in the mobile communication network NW in accordance with an instruction of the main control unit 501. The wireless communication is used to transmit and receive various file data items such as voice data and image data, electronic mail data, and the like, and used to receive Web data, streaming data, and the like.

The display-input unit 520 is so-called a touch panel that displays an image (a still image and a dynamic image), character information, and the like, by control of the main control unit 501 to visually communicate information to a user, as well as detects a user operation with respect to the displayed information, and the display-input unit 520 includes the display panel 521 and the operation panel 522. In a case of viewing a 3D image generated, it is preferable that the display panel 521 is a 3D display panel.

The display panel 521 is formed by using a LCD (Liquid Crystal Display), an OELD (Organic Electro-Luminescence Display), and the like as a display device. The operation panel 522 is mounted so that an image displayed in a screen of the display panel 521 is visible, and is a device that detects one or more coordinates by an operation with a finger of a user and a stylus. When the device is operated with a finger of a user and a stylus, a detection signal caused by the operation is outputted to the main control unit 501. The main control unit 501 then detects an operation position (coordinate) on the display panel 521 on the basis of the received detection signal.

As shown in FIG. 32, the display panel 521 and the operation panel 522 of the smartphone 500 are integrated to constitute the display-input unit 520 in which the display panel 521 is arranged so as to be completely covered with the operation panel 522. In a case where the arrangement above is applied, the operation panel 522 may include a function of detecting a user operation in an area outside the display panel 521. That is, the operation panel 522 may include a detection area (hereinafter referred to as a display area) for an overlapping portion overlapped with the display panel 521, and a detection area (hereinafter referred to as a non-display area) for an outer periphery other than the display area, which does not overlap with the display panel 521.

A size of the display area may completely coincide with a size of the display panel 521, however, it is unnecessary to allow both sizes to coincide with each other. In addition, the operation panel 522 may include two sensitive areas of an outer periphery and an inside area other than the outer periphery. Further, a width of the outer periphery can be appropriately designed depending on a size of the body 502 and the like. Furthermore, any one of a matrix switch method, a resistive film method, a surface elastic wave method, an infrared ray method, an electromagnetic induction method, and a capacitance method, is applicable to the operation panel 522 as a position detection method.

The phone unit 530 includes the speaker 531 and the microphone 532, and converts voice of a user received through the microphone 532 into voice data that can be processed in the main control unit 501 to output the voice data to the main control unit 501, as well as decodes voice data received by the wireless communication unit 510 or the external input-output unit 560 to output the voice data from the speaker 531. In addition, as shown in FIG. 32, the speaker 531 and the microphone 532 are mounted on a face in which the display-input unit 520 is provided, for example. The microphone 532 can be mounted in a side face of the body 502, The operation unit 540 is a hardware key using a key switch and the like, and receives an instruction from a user. As shown in FIG. 32, for example, the operation unit 540 is mounted in a lower face below a display portion of the body 502 of the smartphone 500, and is a push button switch that is turned on when pressed with a finger and is turned off by restoring force of a spring and the like when the finger is removed.

The storage unit 550 stores the following: a control program and control data of the main control unit 501; an application software including an image processing program for creating a left-eye image and a right-eye image in accordance with the present invention; first and second digital filter groups used to generate a stereoscopic image; a parallax map; address data in which names of communications partners, telephone numbers, and the like, are correlated with each other; data of electronic mails that are transmitted and received; Web data downloaded through Web browsing; and content data that is downloaded, as well as temporarily stores streaming data and the like. The storage unit 550 is composed of an internal storage unit 551 built in the smartphone and an external storage unit 552 having an external memory slot into which an external storage is detachable. Each of the internal storage unit 551 and the external storage unit 552, constituting the storage unit 550, is realized by using a storage medium, such as a flash memory type, a hard disk type, a multimedia card micro type, a card type memory (such as a Micro SD (registered trademark) memory), a RAM (Random Access Memory), and a ROM (Read Only Memory).

The external input-output unit 560 serves as an interface with all external apparatuses to be connected to the smartphone 500 in order to directly or indirectly connect to another external apparatus through communication (such as universal serial bus (USB), and IEEE1394), or a network (such as the Internet, a wireless LAN, Bluetooth (registered trademark), REID (Radio Frequency Identification), IrDA (Infrared Data Association) (registered trademark), UWB (Ultra Wideband) (registered trademark), and ZigBee (registered trademark)).

The smartphone 500 is connected to an external apparatus, such as: a wired/wireless headset,; a wired/wireless external charger; a wired/wireless data port; a memory card, a SIM (Subscriber Identity Module) card, and an UIM (User Identity Module) card, which are to be connected through the card socket; an external audio/video apparatus to be connected through an audio/video I/O (Input/Output) (terminal, an external audio/video apparatus to be connected with wireless connection; a smartphone to be connected with wired/wireless connection; a personal computer to be connected with wired/wireless connection; a PDA to be connected with wired/wireless connection; and an earphone.

The external input-output unit is capable of transmitting data transmitted from an external apparatus such as the above to each of components in the smartphone 500 as well as capable of allowing data in the smartphone 500 to be transmitted to an external apparatus.

The GPS receiving unit 570 receives GPS signals transmitted from GPS satellites ST1 to STn in accordance with an instruction of the main control unit 501 to perform positioning calculation processing based on the plurality of received GPS signals, thereby detecting a position of the smartphone 500, defined by a latitude, a longitude, and an altitude. In a case where location information can be acquired from the wireless communication unit 510 and the external input-output unit 560 (such as a wireless LAN), the GPS receiving unit 570 also can detect a position of the smartphone 500 by using the location information. The motion sensor unit 580 includes a triaxial acceleration sensor and the like, for example, to detect a physical motion of the smartphone 500 in accordance with an instruction of the main control unit 501. The physical motion of the smartphone 500 is detected, so that a direction and acceleration of the motion of the smartphone 500 are detected. The detection result above is to be outputted to the main control unit 501.

The power supply unit 590 supplies electric power stored in a battery (not shown) to each of units of the smartphone 500 in accordance with an instruction of the main control unit 501.

The main control unit 501 includes a microprocessor and operates in accordance with a control program and control data stored in the storage unit 550 to perform centralized control of each of units of the smartphone 500. In addition, the main control unit 501 has a mobile communication control function of controlling each of units of a communication system and an application processing function in order to perform voice communication and data communication through the wireless communication unit 510.

The application processing function is realized by allowing the main control unit 501 to operate in accordance with application software stored in the storage unit 550. The application processing function includes an infrared ray communication function of performing data communication with a counterpart device by controlling the external input-output unit 560, an electronic mail function of performing transmission and reception of an electronic mail, a Web browsing function of browsing a Webpage, a function of creating a 3D image from a 2D image in accordance with the present invention, and the like, for example.

In addition, the main control unit 501 includes an image processing function of displaying a video in the display-input unit 520 on the basis of image data (data of a still image and a dynamic image) such as received data and downloaded streaming data, and the like. The image processing function is a function in which the main control unit 501 decodes the image data above and applies image processing to the decoded result to display the image in the display-input unit 520.

Further, the main control unit 501 performs display control with respect to the display panel 521 and operation detection control of detecting a user operation through the operation unit 540 and the operation panel 522.

The display control is performed, so that the main control unit 501 allows a software key such as an icon for starting up application software and a scroll bar, or a window for creating an electronic mail, to be displayed. The scroll bar serves as a software key of receiving an instruction of moving a displaying portion of an image that is too large to fit in a display area of the display panel 521, and the like.

In addition, the operation detection control is performed, so that the main control unit 501 detects a user operation through the operation unit 540, and receives an operation with respect to the icon described above and input of a character string into an input section of the window described above, through the operation panel 522, or receives a request for scrolling a display image through the scroll bar.

Further, the operation detection control is performed, so that the main control unit 501 has a touch panel control function of determining whether an operation position with respect to the operation panel 522 is an overlapping portion (display area) overlapped with the display panel 521 or an outer periphery (non-display area) other than the overlapping portion, without overlapping with the display panel 521, in order to control a sensitive area of the operation panel 522 and a display position of a software key.

The main control unit 501 is also capable of detecting a gesture operation with respect to the operation panel 522 to allow a predetermined function to be performed in accordance with the detected gesture operation. The gesture operation is not a conventional simple touch operation, but an operation such as drawing a trail with a finger, designating a plurality of positions at the same time, and drawing a trail for at least one of the plurality of positions in combination with both of the operations above.

The camera unit (imaging device) 541 is a digital camera that performs electronic photographing by using an imaging element such as a CMOS (Complementary Metal Oxide Semiconductor) and a CCD (Charge-Coupled Device), and has a configuration that is basically identical with the digital camera of each of the embodiments above.

In addition, the camera unit 541 is capable of converting image data acquired by photographing into compressed image data such as a JPEG (Joint Photographic Coding Experts Group) by control of the main control unit 501 so that the compressed image data is recorded in the storage unit 550 or is outputted through the external input-output unit 560 or the wireless communication unit 510. In the smartphone 500 shown in FIG. 32, the camera unit 541 is mounted on a face in which the display-input unit 520 is mounted, but a mounting position of the camera unit 541 is not limited to the above. The camera unit 541 may be mounted on a back face of the display-input unit 520, or a plurality of camera units 541 may be mounted. In a case where a plurality of camera units 541 is mounted, it is possible to perform photographing with a camera unit 541 selected to be used for the photographing, as well as with using the plurality of camera units 541 at the same time.

In addition, the camera unit 541 is available to various functions of the smartphone 500. For example, it is possible to display an image acquired by the camera unit 141 in the display panel 521, as well as possible to use an image acquired by the camera unit 541 as one of operation inputs of the operation panel 522. When the GPS receiving unit 570 detects a position, it is also possible to detect the position by referring to an image received from the camera unit 541. Further, it is also possible to determine an optical axis direction of the camera unit 541 of the smartphone 500 with reference to an image received from the camera unit 541, without using a triaxial acceleration sensor, or together with using the triaxial acceleration sensor, as well as possible to determine present use environment. It is certainly possible to use an image received; from the camera unit 541 in application software.

Other than the above, it is also possible to record image data of a still image or a moving image in the storage unit 550 by adding information, such as location information acquired by the GPS receiving unit 570, voice information acquired by the microphone 532 (text information acquired by performing speech-to-text conversion with a main control unit and the like is available), and posture information acquired by the motion sensor unit 580, and possible to output the image data through the external input-output unit 560 and the wireless communication unit 510.

The smartphone 500 shown in FIGS. 32 and 33 has the same function as that of the digital camera 2 described above. The main control unit 501 shown in FIG. 33 has a function that the image processing circuit 29 shown in FIG. 6 or 22 has. That is, the main control unit 501 constitutes the "image generation device", the "boundary change device", the "selection device", the "display control device", and the "image analysis device" in the present invention. In addition, the display-input unit 520 (touch panel type display) constitutes the "display device", the "position input device", and the "number input device" in the present invention.

In the smartphone 500 of the present example, the display-input unit 520 accepts a drag operation of dragging the split line 63, shown in FIG. 12. When the drag operation of dragging the split line 63 (boundary line) is performed in the display-input unit 520 in a state where the split image 61 (focus-confirmation image) is displayed, the main control unit 501 serving as the boundary change device changes a position of the split line 63 in the split image 61 in a direction orthogonal to the split line 63 in response to the drag operation. Change of a position of the split line 63 as the above is mainly performed by the main control unit 501 serving as the boundary change device.

In addition, for example, it is also possible to change an angle of the split line 63 (boundary line) by centering a middle point of the split line 63 by dragging near an edge of the split line 63 in a touch panel of the display-input unit 520. Change of an angle of the split line 63 as the above is mainly performed by the main control unit 501 serving as a boundary change unit. That is, the boundary change device of the present invention may have not only a function of changing a position of the split line 63 in the direction orthogonal to the split line 63, but also a function of changing an angle of the split line 63.

As above, although the present invention is described for each of the various embodiments in order to facilitate understanding of the present invention, the various embodiments may be appropriately combined to practice the present invention.

The present invention is not limited to the embodiments described in the present specification and the embodiments illustrated in the drawings, but may include various design changes and modifications within a range without departing from the essence of the present invention as a matter of course.

What is claimed is:

1. An imaging device comprising:
    an image generation device configured to generate a first image for display on the basis of an image outputted from an imaging element provided with first and second pixel groups on which subject light beams passing through first and second regions in a photographic lens are incident, respectively, after pupil-split is applied to the subject light beams, and configured to generate a second image for display that is used for focus-confirmation on the basis of a first image and a second image outputted from the first and second pixel groups, respectively;

a boundary change device configured to change a position of a boundary between the first image and the second image in the second image for display, in a direction orthogonal to the boundary;

a selection device configured to select any one of the first image and the second image for each of a plurality of divisions in the second image for display, divided by the boundary changed by the boundary change device;

a display device; and a display control device configured to control the display device to display the first image for display, and allows the second image for display in which a position of the boundary is changed by the boundary change device that is displayed in a display area in the first image for display.

2. The imaging device according to claim 1, further comprising a position input device configured to input a command for changing a position of the boundary in the second image for display, wherein the boundary change device changes a position of the boundary in the second image for display in accordance with the command for changing a position received from the position input device so that the display device displays the position.

3. The imaging device according to claim 2, wherein the display device is a display device of a touch panel type, and the position input device is composed of the display device of a touch panel type, and when a drag operation of dragging the boundary in the second image for display is performed on the display device of a touch panel type while the second image for display is displayed on the display device, the boundary change device changes a position of the boundary in the second image for display in response to the drag operation.

4. The imaging device according to claim 1, further comprising a number input device configured to input the number of boundaries in the second image for display, wherein the boundary change device changes the number of the boundaries in the second image for display in accordance with the command for changing the number received from the number input device so that the display device displays the number of the boundaries.

5. The imaging device according to claim 4, wherein when the number L of the boundaries received is an odd number, the boundary change device positions a boundary at a place of (L+1)/2 of the number L of the boundaries at the center of the second image for display, or at a position near the center of the second image for display.

6. The imaging device according to claim 1, wherein the boundary change device changes a position of the boundary in the second image for display as time elapses.

7. The imaging device according to claim 6, further comprising a focusing operation device configured to change a focus position of a photographic lens, wherein when the focusing operation device starts changing a focus position, the boundary change device stops movement of a boundary in the second image for display.

8. The imaging device according to claim 1, wherein the imaging element further includes a third pixel group to which subject light beams are incident in a state where pupil-split is not applied to the light beams, and the first image for display is generated on the basis of a third image outputted from the third pixel group.

9. The imaging device according to claim 8, wherein the image generation device arranges the first image and the second image in the second image for display so that the first image and the second image are adjacent to each other.

10. The imaging device according to claim 9, the image generation device arranges the third image in the second image for display so that the third image is adjacent to the first image and the second image.

11. The imaging device according to claim 1, wherein the image generation device alternately arranges the first image and the second image in a first direction in the second image for display, as well as alternately arranges the first image and the second image in a second direction orthogonal to the first direction in the second image for display, to generate the second image for display in which the first image and the second image are arranged in a lattice pattern.

12. The imaging device according to claim 1, further comprising an image analysis device configured to analyze an image outputted from the imaging element, wherein the boundary change device changes a position of the boundary in the second image for display on the basis of an analysis result obtained by the image analysis device.

13. The imaging device according to claim 12, wherein the image analysis device detects phase difference between pixels of the first images and pixels of the second image corresponding to the pixels of the first image, and the boundary change device changes a position of the boundary in the second image for display on the basis of the detected phase difference.

14. The imaging device according to claim 12, wherein the image analysis device detects contrast in the image, and the boundary change device changes a position of the boundary in the second image for display on the basis of the amount of the detected contrast.

15. The imaging device according to claim 12, wherein the image analysis device detect an edge in a direction of the boundary of the image, and the boundary change device changes a position of the boundary in the second image for display on the basis of the amount of the detected edge.

16. The imaging device according to claim 12, the image analysis device detects a specific object in the image, and the boundary change device set the boundary in the second image for display at a position of the detected specific object.

17. The imaging device according to claim 1, wherein the display control device allows an index showing a position of the boundary to be indicated near the boundary.

18. A focus-confirmation display method that uses an imaging element provided with first and second pixel groups on which subject light beams passing through first and second regions in a photographic lens are incident, respectively, after pupil-split is applied to the subject light beams, and that uses a display device, the focus-confirmation display method comprising the steps of:

controlling the display device to display a first image for display generated on the basis of an image outputted from the imaging element;

displaying a second image for display generated on the basis of a first image and a second image that are outputted from the first and second pixel groups, respectively, that is used for focus-confirmation in a display area in the first image for display;

changing a position of a boundary between the first image and the second image in the second image for display in a direction orthogonal to the boundary;

selecting any one of the first image and the second image for each of a plurality of divisions divided by the changed boundary in the second image for display; and displaying the second image for display in which a position of the boundary is changed in the display area in the first image for display.

\* \* \* \* \*